United States Patent
Ryu et al.

(10) Patent No.: US 9,066,271 B2
(45) Date of Patent: Jun. 23, 2015

(54) MOBILE TERMINAL AND METHOD OF MANAGING AND PERFORMING DATA COMMUNICATION USING THE SAME

(75) Inventors: Sungjoon Ryu, Seoul (KR); Kwangsik Kong, Seoul (KR); Juno Jung, Seoul (KR); Wonjong Lee, Seoul (KR); Bosoo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 597 days.

(21) Appl. No.: 12/886,820

(22) Filed: Sep. 21, 2010

(65) Prior Publication Data

US 2011/0075635 A1  Mar. 31, 2011

(30) Foreign Application Priority Data

Sep. 25, 2009 (KR) .................. 10-2009-0090984
Sep. 25, 2009 (KR) .................. 10-2009-0090985
Sep. 28, 2009 (KR) .................. 10-2009-0091619

(51) Int. Cl.
*H04W 36/14* (2009.01)
*H04W 36/00* (2009.01)
*H04W 48/18* (2009.01)
*H04W 88/06* (2009.01)

(52) U.S. Cl.
CPC .......... *H04W 36/14* (2013.01); *H04W 36/0088* (2013.01); *H04W 48/18* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 6,868,080 B1* | 3/2005 | Umansky et al. | 370/354 |
| 2004/0030791 A1* | 2/2004 | Dorenbosch et al. | 709/230 |
| 2004/0142657 A1* | 7/2004 | Maeda | 455/11.1 |
| 2005/0059397 A1* | 3/2005 | Zhao | 455/435.2 |
| 2005/0066033 A1* | 3/2005 | Cheston et al. | 709/225 |
| 2006/0039335 A1* | 2/2006 | Ono et al. | 370/338 |
| 2006/0083238 A1* | 4/2006 | Lee et al. | 370/389 |
| 2006/0174018 A1* | 8/2006 | Zhu et al. | 709/229 |
| 2006/0218298 A1* | 9/2006 | Knapp et al. | 709/238 |
| 2007/0223455 A1* | 9/2007 | Chang et al. | 370/352 |
| 2007/0255797 A1* | 11/2007 | Dunn et al. | 709/217 |
| 2008/0207187 A1 | 8/2008 | Maillard | 455/418 |
| 2008/0311912 A1 | 12/2008 | Balasubramanian et al. | 455/436 |
| 2009/0016310 A1 | 1/2009 | Rasal | 370/342 |
| 2009/0024728 A1* | 1/2009 | Russell | 709/223 |
| 2010/0085948 A1* | 4/2010 | Yu et al. | 370/338 |

OTHER PUBLICATIONS

European Search Report dated Aug. 10, 2011 issued in Application No. 10 01 0590.

* cited by examiner

*Primary Examiner* — Gregory Sefcheck
*Assistant Examiner* — Joshua Smith
(74) *Attorney, Agent, or Firm* — KED & Associates LLP

(57) ABSTRACT

A mobile terminal and a method of managing and performing data communication using the same are provided. The mobile terminal effectively performs data communication over heterogeneous networks at a low cost and effectively manages communication modules connected to the heterogeneous network, and the method performs and manages data communication using the mobile terminal.

2 Claims, 21 Drawing Sheets

| MSB | 27~21 | 20~16 | 15 | 14 | 13 | 12~5 | 4~2 | 1~0 |
|---|---|---|---|---|---|---|---|---|
| Meaning of bits | CN | RNC | Freezone indicator | WiBro indicator | CDMA indicator | Node B | Sector | FA |
| Number of bits | 7 | 5 | 1 | 1 | 1 | 8 | 3 | 3 |

US 9,066,271 B2

MOBILE TERMINAL AND METHOD OF MANAGING AND PERFORMING DATA COMMUNICATION USING THE SAME

This nonprovisional application claims priority under 35 U.S.C. §119(a) on Patent Application Nos. 10-2009-0090984 filed in Republic of Korea on Sep. 25, 2009, 10-2009-0090985 filed in Republic of Korea on Sep. 25, 2009 and 10-2009-0091619 filed in Republic of Korea on Sep. 28, 2009, the entire contents of which are hereby incorporated by reference.

BACKGROUND

1. Field

This document relates to data communication and, more particularly, to a mobile terminal capable of effectively performing data communication over heterogeneous networks at a low cost and effectively managing communication modules connected to the heterogeneous network, and a method for managing and performing data communication using the same.

2. Related Art

Recently, mobile terminals (e.g., dual band dual mode (DBDM) terminals) capable of accessing (or connecting to) heterogeneous networks have been released on the back of the advancement of communication technologies and terminal techniques.

However, the related art DBDM terminals are mostly set to access costly and ineffective networks in performing particular data communication without consideration of a network connection cost and a network access efficiency, causing a great deal of inconvenience of users.

Also, the related art DBDM terminals cannot effectively manage communication modules that are able of access the heterogeneous networks, causing unnecessary power consumption and unnecessary operations to bring about ineffectiveness.

SUMMARY

An aspect of this document is to provide a mobile terminal capable of effectively performing data communication over heterogeneous networks at a low cost and effectively managing communication modules connected to the heterogeneous network, and a method for managing and performing data communication using the same.

In a first aspect, a method for performing data communication by a mobile terminal that can access both first and second networks, the heterogeneous networks which can be connected with the Internet, comprises: performing particular data communication via the first network; when a communication environment with the first network deteriorates while performing the particular data communication, terminating the connection with the first network, and accessing the second network to continuously perform the particular data communication via the second network; periodically checking whether or not a connection to the first network is available, while performing the data communication via the second network; and when a connection to the first network is available, terminating the connection with the second network and accessing the first network to continuously perform the particular data communication via the first network.

In a second aspect, a method for performing data communication by a mobile terminal that can access both first and second networks, the heterogeneous networks which can be connected with the Internet, comprises: activating an application using the second network as a dedicated network in a state that the mobile terminal is connected with the first network; terminating the connection with the first network according to the activation of the application, and accessing the second network to perform data communication using the application; and when the application is terminated, terminating the connection with the second network and accessing the first network.

In a third aspect, a method for performing data communication by a mobile terminal that can access both first and second networks, the heterogeneous networks which can be connected with the Internet, comprises: setting at least one of the first and second networks for one or more applications providing a data communication function, respectively; activating one of the applications; and when data communication needs to be performed by the activated application, accessing the network set for the activated application, among the first and second networks, to perform data communication.

In a fourth aspect, a method for performing data communication by a mobile terminal that can access both first and second networks, the heterogeneous networks which can be connected with the Internet, comprises: when a communication environment with the first network deteriorates, determining whether or not a current location of the mobile terminal is in an area registered as a communication poor area of the first network; if it is determined that the current location has been registered as a communication poor area, terminating the connection with the first network; and if it is determined that the current location has not been registered as a communication poor area, registering the current location as a communication poor area of the first network.

In a fifth aspect, a mobile terminal comprises: a wireless Internet module configured to access a mobile Internet (WiBro or WiMax) according to a standard protocol of the IEEE 802.16 group; a mobile communication module configured to access a mobile communication network including at least one of a wideband code division multiple access (WCDMA) and a high speed downlink packet access (HSDPA); and a controller configured to terminate a connection with the mobile Internet if a communication environment with the mobile Internet deteriorates while performing particular data communication with the mobile Internet, access the mobile communication network to continuously perform the particular data communication, periodically check whether or not a connection with the mobile Internet is available, terminate the connection with the mobile communication network if a connection with the mobile Internet is available, and access the mobile Internet to continuously perform the particular data communication via the mobile Internet.

In a sixth aspect, a mobile terminal comprises: a wireless Internet module configured to access a mobile Internet (WiBro or WiMax) according to a standard protocol of the IEEE 802.16 group; a mobile communication module configured to access a mobile communication network including at least one of a wideband code division multiple access (WCDMA) and a high speed downlink packet access (HSDPA); and a controller configured to terminate a connection with the mobile Internet and access the mobile communication network to perform data communication using an application using the mobile communication network as a dedicated network when the application is activated in a state that the mobile terminal is connected with the mobile Internet, and terminate the connection with the mobile communication network and access the mobile Internet when the application is terminated.

In a seventh aspect, a mobile terminal comprises: a wireless Internet module configured to access a mobile Internet (WiBro or WiMax) according to a standard protocol of the IEEE 802.16 group; a mobile communication module configured to access a mobile communication network including at least one of a wideband code division multiple access (WCDMA) and a high speed downlink packet access (HSDPA); and a controller configured to access a network set for an activated application, among the mobile Internet and the mobile communication network, to perform data communication when the data communication needs to be performed by the activated application, in a state that at least one of the mobile Internet and the mobile communication network is set for one or more applications providing a data communication function, respectively, and one of the applications is activated.

In an eighth aspect, a mobile terminal comprises: a wireless Internet module configured to access a mobile Internet (WiBro or WiMax) according to a standard protocol of the IEEE 802.16 group; a mobile communication module configured to access a mobile communication network including at least one of a wideband code division multiple access (WCDMA) and a high speed downlink packet access (HSDPA); and a controller configured to determine whether or not a current location is an area which has been registered as a communication poor area of the mobile Internet when a communication environment with the mobile Internet deteriorates, terminate a connection with the mobile Internet if it is determined that the current location has been registered as a communication poor area, and register the current location as a communication poor area of the mobile Internet if it is determined that the current location has not been registered as a communication poor area.

In a ninth aspect, a method for managing data communication by a mobile terminal that can access both first and second networks, the heterogeneous networks which can be connected with the Internet, comprises: receiving system information including information regarding whether or not a current location of the mobile terminal corresponds to an accessible area of the first network from the second network; and if the received system information is classified to be bad according to a pre-set first reference, deactivating a communication module for accessing the first network, wherein the first reference comprises at least one of a case where a communication environment with the second network deteriorates and a case where an error is detected from the received system information.

In a tenth aspect, a method for managing data communication by a mobile terminal that can access both first and second networks, the heterogeneous networks which can be connected with the Internet, comprises: acquiring a current location of the mobile terminal; determining whether or not the acquired current location is in an area which has been registered in a database that manages a communication poor area of at least one of the first and second networks with reference to the database; and if it is determined that the current location is in an area which has been registered in the database, deactivating a communication module for accessing the first network.

In an eleventh aspect, a mobile terminal comprises: a wireless Internet module configured to access a mobile Internet (WiBro or WiMax) according to a standard protocol of the IEEE 802.16 group; a mobile communication module configured to access a mobile communication network including at least one of a wideband code division multiple access (WCDMA) and a high speed downlink packet access (HSDPA); and a controller configured to receive system information including information regarding whether or not a current location corresponds to an accessible area of the mobile Internet from the mobile communication network, and deactivate the wireless Internet module if the received system information is classified to be bad based on a pre-set reference, wherein the pre-set reference includes at least one of a case where a communication environment with the mobile communication network deteriorates and a case where an error is detected from the received system information.

In a twelfth aspect, a mobile terminal comprises: a wireless Internet module configured to access a mobile Internet (WiBro or WiMax) according to a standard protocol of the IEEE 802.16 group; a mobile communication module configured to access a mobile communication network including at least one of a wideband code division multiple access (WCDMA) and a high speed downlink packet access (HSDPA); a location information module configured to acquire location information; and a controller configured to control the location information module to acquire a current location, and deactivate the wireless Internet module if the acquired current location is in an area which has been registered in a database that manages a communication poor area of at least one of the mobile Internet and the mobile communication network according to the result of referring to the database.

In a thirteenth aspect, a method for managing data communication by a mobile terminal that can access both first and second networks, the heterogeneous networks which can be connected with the Internet, comprises: activating a particular application for which the second network has been set as a dedicated network in a state that both first communication module for accessing the first network and second communication module for accessing the second network are activated; maintaining the activated state of the second communication module according to the activation of the particular application; and deactivating the first communication module in consideration of a pre-set reference according to the activation of the particular application.

In a fourteenth aspect, a mobile terminal comprises: a wireless Internet module configured to access a mobile Internet (WiBro or WiMax) according to a standard protocol of the IEEE 802.16 group; a mobile communication module configured to access a mobile communication network including at least one of a wideband code division multiple access (WCDMA) and a high speed downlink packet access (HSDPA); and a controller configured to maintain an activated state of the mobile communication module and deactivate the wireless Internet module in consideration of a pre-set reference, according to an activation of a particular application for which the mobile communication network has been set as a dedicated network in a state that both the wireless Internet module and the mobile communication module are activated.

According to the mobile terminal and method for managing and performing data communication using the same according to the exemplary embodiment of the present invention, data communication can be performed effectively at a low cost with respect to heterogeneous networks, and communication modules for accessing the heterogeneous networks can be effectively managed.

BRIEF DESCRIPTION OF THE DRAWINGS

The implementation of this document will be described in detail with reference to the following drawings in which like numerals refer to like elements.

DETAILED DESCRIPTION

Figure 1:
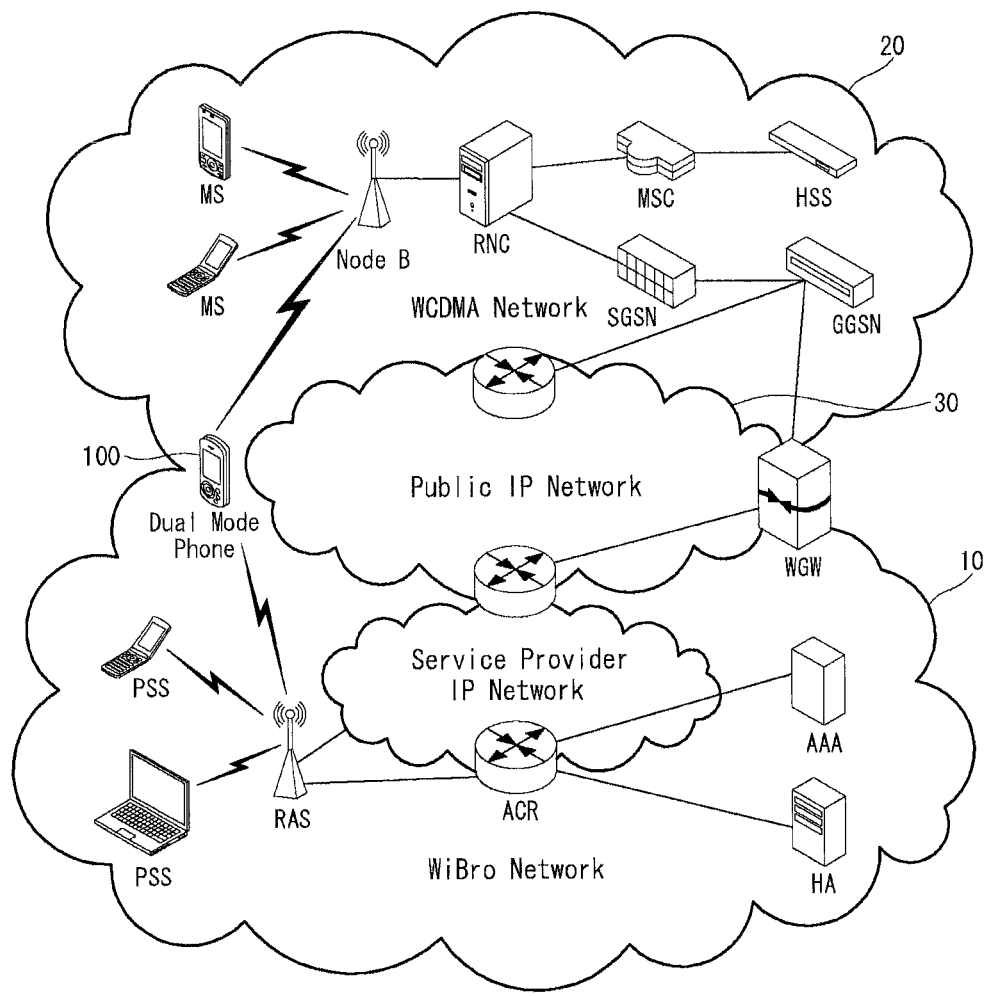
FIG. 1 illustrates an example of a system environment to which this document is applied.

The foregoing and other objects, features, aspects and advantages of the present invention will become more apparent from the following detailed description of the present invention when taken in conjunction with the accompanying drawings. Exemplary embodiments of the present invention will now be described in detail with reference to the accompanying drawings. The same reference numerals will be used throughout to designate the same or like components. In describing the present invention, if a detailed explanation for a related known function or construction is considered to unnecessarily divert the gist of the present invention, such explanation will be omitted but would be understood by those skilled in the art.

FIG. 1 illustrates an example of a system environment to which this document is applied. The present invention may be applicable to a system environment including heterogeneous networks in conformity with different communication protocols.

For example, with reference to FIG. 1, the present invention may be applicable to a system environment including two or more heterogeneous networks including first and second networks 10 and 20, the Internet 20, and a mobile terminal 100 that can access two or more heterogeneous networks.

In FIG. 1, a mobile Internet 10 is illustrated as the first network 10 and a WCDMA network (or an HSDPA network) is illustrated as the second network 20.

The mobile Internet 10 may be based on a wireless Internet technique in conformity with a standard protocol of the IEEE 802.16 group, which is also called WiBro (Wireless Broadband) or WiMax (Worldwide Interoperability for Microwave Access). The WiBro or WiMax is a known art, so a detailed description thereof will be omitted.

The mobile communication network 20 mentioned in this document may include a global system for mobile communication (GSM) network, a code division multiple access 2000 (CDMA2000) network, a wideband code division multiple access (WCDMA) network, a high speed downlink packet access (HSDPA) network, and a next-generation mobile communication network to be applied in the future.

In particular, the mobile communication network 20 mentioned in this document may include any mobile communication network that can be connected with the Internet 30. Such mobile communication network is conventional, so a detailed description thereof will be omitted.

The mobile terminal 100 may access the Internet 30 via the mobile Internet 10 and/or the mobile communication network 20 to perform data communication.

The terminal that can access two or more heterogeneous networks is also called a dual band dual mode (DBDM) terminal.

FIG. 1 illustrates an example of a system environment to which this document is applied, and the two or more heterogeneous networks mentioned in this document are not meant to be limited to the mobile Internet 10 and the mobile communication network 20.

The mobile terminal 100 according to exemplary embodiments of the present invention will now be described with reference to the accompanying drawings. In the following description, usage of suffixes such as 'module', 'part' or 'unit' used for referring to elements is given merely to facilitate explanation of the present invention, without having any significant meaning by itself.

The mobile terminal described in this document may include mobile phones, smart phones, notebook computers, digital broadcasting terminals, PDAs (Personal Digital Assistants), PMPs (Portable Multimedia Player), navigation terminals, and the like.

Figure 2:
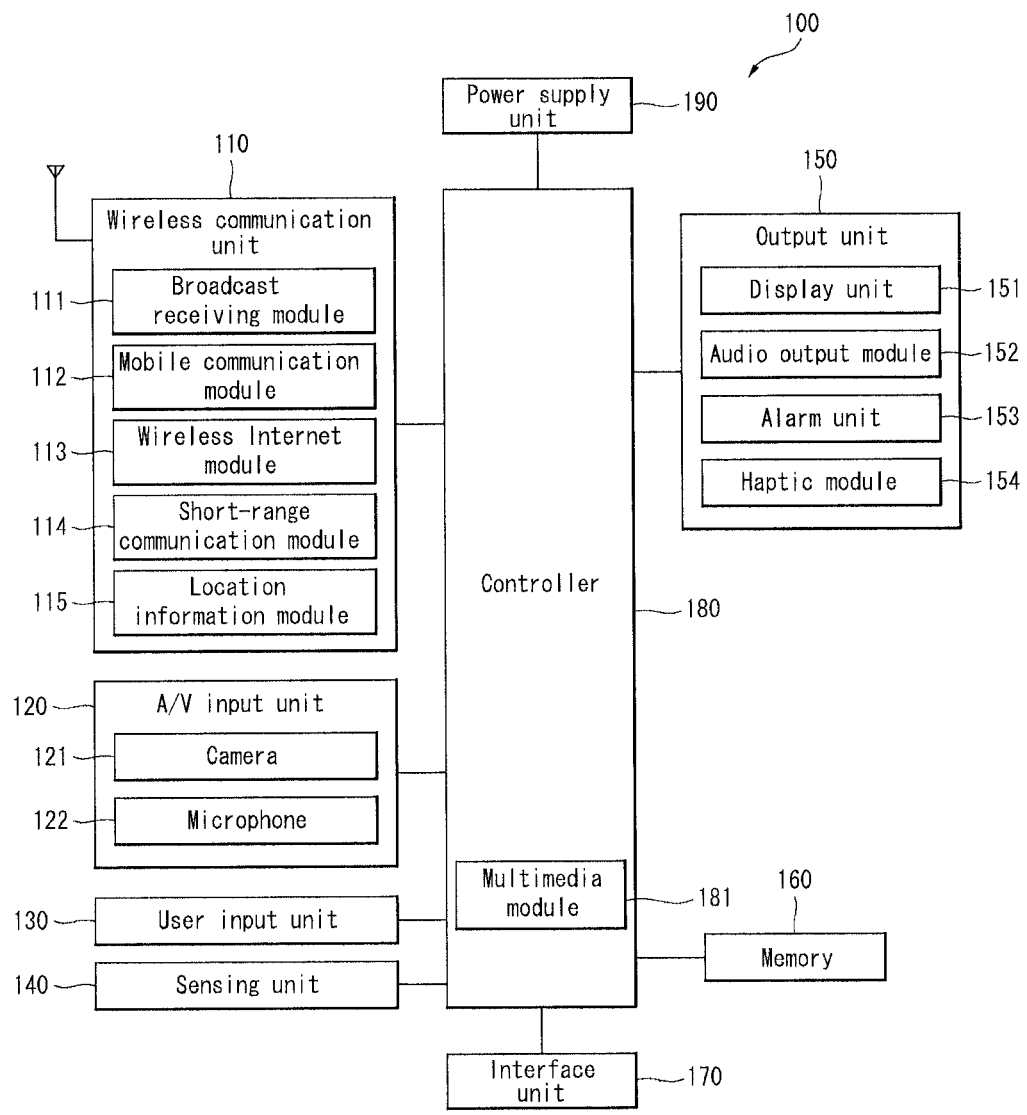
FIG. 2 is a schematic block diagram of a mobile terminal according to an exemplary embodiment of the present invention.

FIG. 2 is a block diagram of a mobile terminal according to an exemplary embodiment of the present invention.

The mobile terminal 100 may include a wireless communication unit 110, an A/V (Audio/video) input unit 120, a user input unit 130, a sensing unit 140, an output unit 150, a memory 160, an interface unit 170, a controller 180, a power supply unit 190, etc. FIG. 1 shows the mobile terminal as having various components, but it should be understood that implementing all of the illustrated components is not a requirement. Greater or fewer components may alternatively be implemented.

The components or elements will now be described one by one.

The wireless communication unit 110 typically includes one or more components allowing radio communication between the mobile terminal 100 and a wireless communication system or a network in which the mobile terminal is located. For example, the wireless communication unit 110 may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal obtained by combining a data broadcast signal with a TV or radio broadcast signal.

The broadcast associated information may refer to information associated with a broadcast channel, a broadcast program or a broadcast service provider. The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive broadcast signals by using various types of broadcast systems. In particular, the broadcast receiving module 111 may receive a digital broadcast signal by using a digital broadcasting system such as multimedia broadcasting-terrestrial (DMB-T), digital multimedia broadcasting-satellite (DMB-S), media forward link only (MediaFLO®) digital video broadcast-handheld (DVB-H), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module ill may be stored in the memory 160.

The mobile communication module 112 transmits and/or receives radio signals to and/or from at least one of a base station, an external terminal, and a server. Such radio signals may include a voice call signal, a video call signal, or various types of data according to text and/or multimedia message transmission and/or reception.

The mobile communication module 112 may access the Internet 30 via the mobile communication network 20 to perform data communication.

The wireless Internet module 113 refers to a module for a wireless Internet access for the mobile terminal. This module may be internally or externally coupled to the terminal. The wireless Internet access technique implemented may include a WLAN (Wireless LAN) (Wi-Fi), WiBro (Wireless Broadband), WiMax (World Interoperability for Microwave Access), or the like.

For example, the wireless Internet module 113 may access the Internet 30 via the mobile Internet 10 and perform data communication.

The short-range communication module 114 is module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location of the mobile terminal. The location information module 115 may acquire location information by using a global navigation satellite system (GNSS). Here, the GNSS is the standard generic term for satellite navigation systems revolving around the earth and allowing certain types of radio navigation receivers to transmit reference signals determining their location on or in the vicinity of the surface of the earth. The GNSS may include the United States' global positioning system (GPS), the European Union's Galileo positioning system, the Russian global orbiting navigational satellite system (GLONASS), the compass navigation system by the People's Republic of China, and the quasi-zenith satellite system (QZSS) by Japan.

A typical example of GNSS is a GPS (Global Positioning System) module. The GPS module 115 may calculate information regarding the distance from one point (entity) to three or more satellites and information regarding time at which the distance information was measured, and applies trigonometry to the calculated distance, thereby calculating three-dimensional location information according to latitude, longitude, and altitude with respect to the one point (entity). In addition, a method of acquiring location and time information by using three satellites and correcting an error of the calculated location and time information by using another one satellite may be also used. The GPS module 115 may continuously calculate the current location in real time and also calculate speed information by using the continuously calculated current location.

With reference to FIG. 2, the A/V input unit 120 is configured to receive an audio or video signal. The A/V input unit 120 may include a camera 121 and a microphone 122. The camera 121 processes image frames of still pictures or video obtained by an image sensor in a video call mode or an image capturing mode. The thusly processed image frames may be displayed on a display module 151.

The image frames processed by the camera 121 may be stored in the memory 160 or transmitted to the exterior via the wireless communication unit 110. The mobile terminal 100 may include two or more cameras 121 mounted thereon.

The microphone 122 may receive an external audio signal via a microphone in a phone call mode, a recording mode, a voice recognition mode, and the like, and process such signal into electrical audio (voice) data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate input data from commands entered by a user to control various operations of the mobile terminal. The user input unit 130 may include various input units such as a keypad, a dome switch, a touch pad, a jog wheel, a jog switch, and the like.

The sensing unit 140 detects a current status of the mobile terminal 100 such as an open or closed state of the mobile terminal 100, the location of the mobile terminal 100, the presence or absence of a user contact with the mobile terminal 100 (i.e., touch inputs), the orientation of the mobile terminal 100, an acceleration or deceleration of the mobile terminal 100, etc., and generates commands or signals for controlling the operation of the mobile terminal 100. For example, when the mobile terminal 100 is a slide type mobile phone, the sensing unit 140 may sense whether or not the slide type mobile phone is open or closed. In addition, the sensing unit 140 may detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

Some of them may be configured to be transparent or light-transmissive to allow viewing of the exterior, which may be called transparent displays. A typical transparent display may be, for example, a TOLED (Transparent Organic Light Emitting Diode) display, or the like. Through such configuration, the user can view an object positioned at the rear side of the terminal body through the region occupied by the display unit 151 of the terminal body.

The mobile terminal 100 may include two or more display units according to its particular desired embodiment. For example, a plurality of display units may be separately or integrally disposed on one surface of the mobile terminal, or may be separately disposed on mutually different surfaces.

Meanwhile, when the display unit 151 and a sensor (referred to as a 'touch sensor', hereinafter) for detecting a touch operation are overlaid in a layered manner to form a touch screen, the display unit 151 may function as both an input device and an output device. The touch sensor may have a form of a touch film, a touch sheet, a touch pad, and the like.

The touch sensor may be configured to convert pressure applied to a particular portion of the display unit 151 or a change in the capacitance or the like generated at a particular portion of the display unit 151 into an electrical input signal. The touch sensor may be configured to detect the pressure when a touch is applied, as well as the touched position and area.

When there is a touch input with respect to the touch sensor, a corresponding signal (signals) are transmitted to a touch controller. The touch controller processes the signals and transmits corresponding data to the controller 180. Accordingly, the controller 180 may recognize which portion of the display unit 151 has been touched.

The proximity sensor 141 may be disposed at an internal area of the mobile terminal 100 covered by the touch screen or near the touch screen. The proximity sensor 141 is a sensor for detecting the presence or absence of an object relative to a certain detection surface or an object that exists nearby by using the force of electromagnetism or infrared rays without a physical contact. Thus, the proximity sensor 141 has a considerably longer life span compared with a contact type sensor, and it can be utilized for various purposes.

Examples of the proximity sensor 141 may include a transmission type photoelectric sensor, a direct reflection type photoelectric sensor, a mirror-reflection type photo sensor, an RF oscillation type proximity sensor, a capacitance type proximity sensor, a magnetic proximity sensor, an infrared proximity sensor, and the like.

In case where the touch screen is the capacitance type, proximity of the pointer is detected by a change in electric field according to the proximity of the pointer. In this case, the touch screen (touch sensor) may be classified as a proximity sensor.

In the following description, for the sake of brevity, recognition of the pointer positioned to be close to the touch screen will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

The proximity sensor 141 may detect a proximity touch and a proximity touch pattern (e.g., a proximity touch distance, a proximity touch speed, a proximity touch time, a proximity touch position, a proximity touch movement state, or the like), and output information corresponding to the detected proximity touch operation and the proximity touch pattern to the touch screen.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or other sound generating device. Also, the audio output module 152 may output a sound through an earphone jack 116. The user may connect an earphone to the earphone jack 116 to listen to an output sound.

The alarm unit 153 may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations. A video signal or an audio signal may be also outputted through the display unit 151 or the audio output module 152.

The haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

The various embodiments described herein may be implemented within a computer-readable recording medium or a recording medium that can be read by a device similar to the computer by using software, hardware, or their combination.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Exemplary embodiments of the present invention will now be described. The exemplary embodiments described hereinafter relate to data communication through heterogeneous networks following different communication protocols.

In the following description, it is assumed that the heterogeneous networks are the mobile Internet 10 and the mobile communication network 20 such as a WCDMA/HSDPA.

The memory 160 may store various applications. The controller 180 may call a particular application among the various applications according to a user instruction or under a particular condition, to activate it.

The activated application may provide a graphical user interface to the display unit 151, or may be executed as a background.

The activated application may need data communication for transmitting and/or receiving data to/from the Internet 30.

For example, the applications stored in the memory 160 may include a stock application for receiving stock information and transmitting and receiving information related to dealing in stocks, a weather application for receiving weather information, a traffic application for receiving traffic information, a map application for receiving map information and/or road guidance information, a Web browser, and the like.

The exemplary embodiments described hereinafter may accompany data communication through the foregoing applications.

Figure 3:
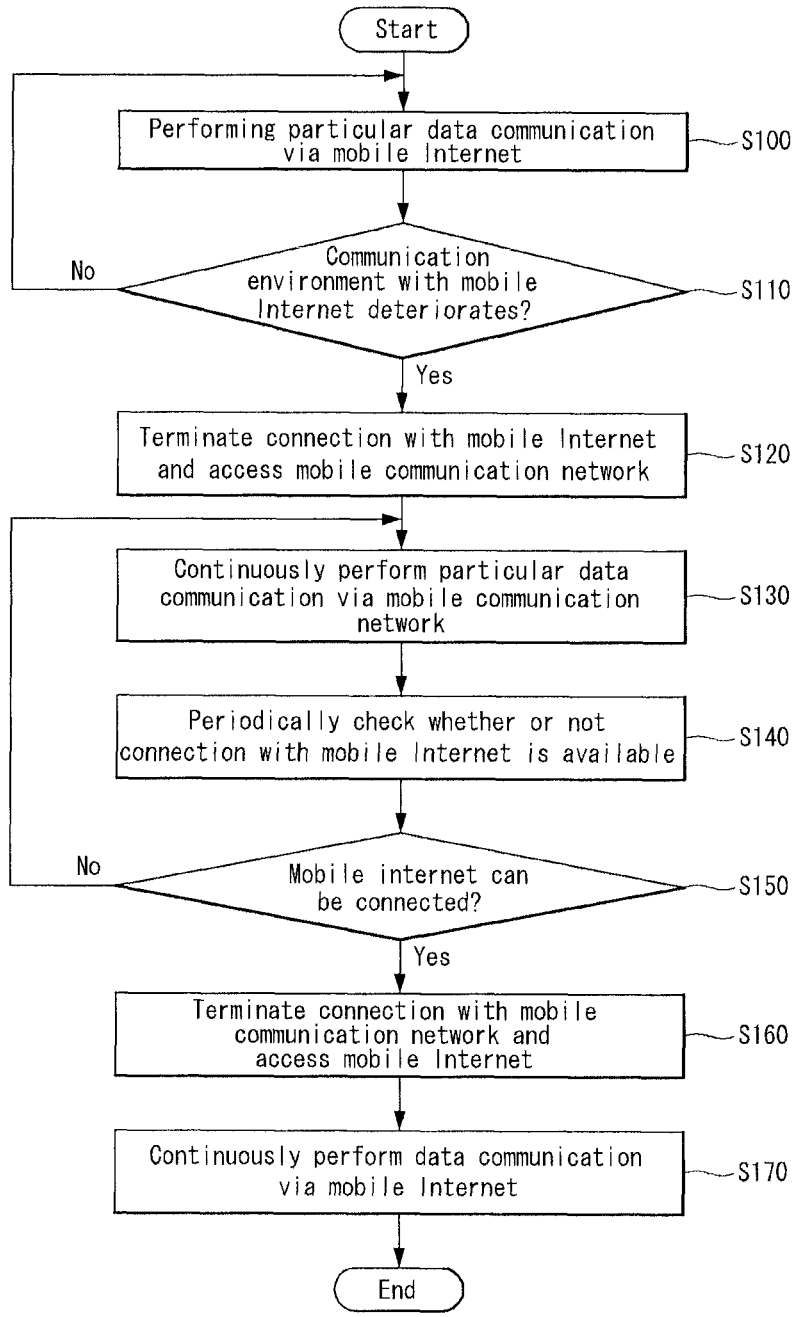
FIG. 3 is a flow chart illustrating the process of a method for performing data communication of a mobile terminal according to a first exemplary embodiment of the present invention.
Figures 4, 5:
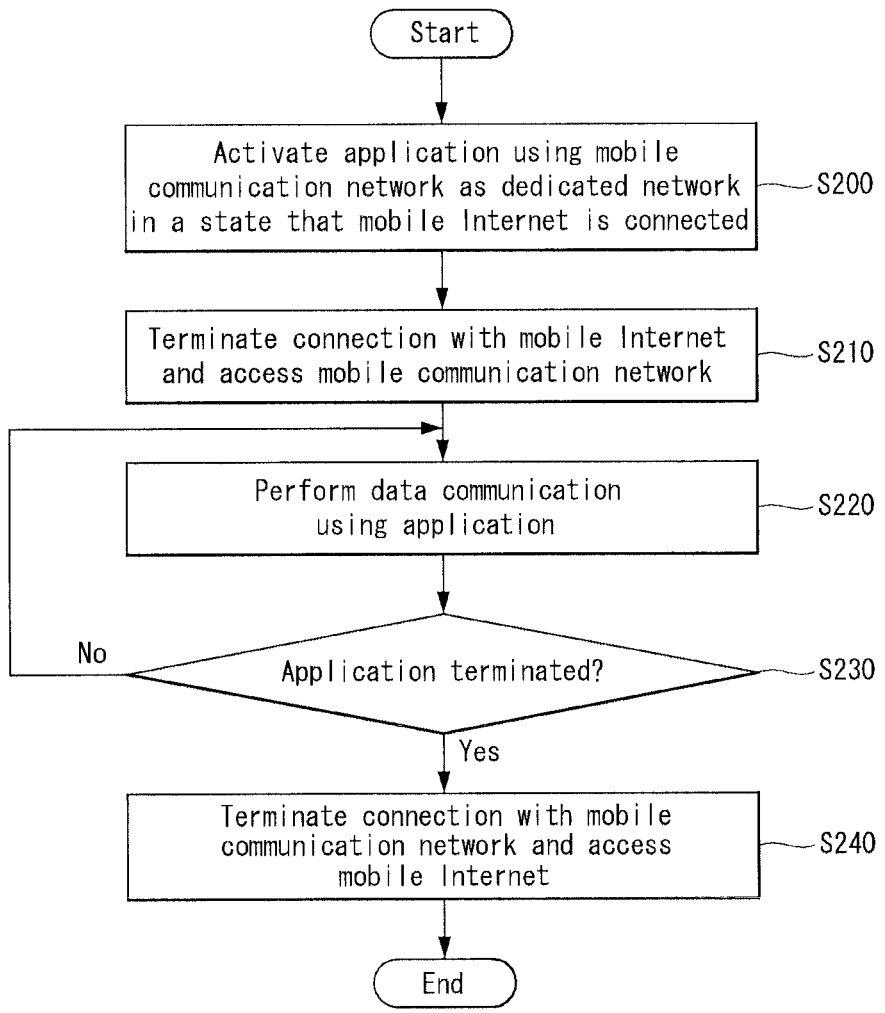
FIG. 4 illustrates an example of system information received from a WCDMA network.
FIG. 5 is a flow chart illustrating the process of a method for performing data communication of a mobile terminal according to a second exemplary embodiment of the present invention.

FIG. 3 is a flow chart illustrating the process of a method for performing data communication of a mobile terminal according to a first exemplary embodiment of the present invention. FIG. 4 illustrates an example of system information received from a WCDMA network.

The method for performing data communication according to the first exemplary embodiment of the present invention may be implemented in the system environment and the mobile terminal 100 as described above with reference to FIGS. 1 and 2. The method for performing data communication of the mobile terminal according to the first exemplary embodiment of the present invention and the operation of the mobile terminal 100 for implementing the same will now be described in detail.

With reference to FIG. 3, the controller 180 may perform particular data communication via the mobile Internet 10 (S100).

The particular data communication may be, for example, Web surfing through the Internet, file downloading, and the like.

The controller 180 determines whether or not a communication environment with the mobile Internet 10 deteriorates while performing the particular data communication (S110).

For example, if a received signal strength indication (RSSI) received from the mobile Internet 10 is lower than a pre-set reference value, the controller 180 may determine that the communication environment with the mobile Internet 10 has deteriorated.

Also, for example, if an error of system information and various information received from the mobile Internet 10 increases, the controller 180 may determine that the communication environment with the mobile Internet 10 has deteriorated.

FIG. 4 illustrates an example of a system information block (SIB), i.e., system information received via the mobile communication module 112 from the mobile communication network 20.

The SIB illustrated in FIG. 4 includes information (i.e., WiBro indicator 40) indicating whether an area is available for communication with the mobile Internet 10.

The SIB illustrated in FIG. 4 is merely illustrative, and if the communication protocol of the mobile communication network 20 follows a different communication protocol, not that of the WCDMA, the SIB may be changed to have a different format. Also, the structure and terminology of the SIB illustrated in FIG. 4, and the number of bits of each information included in the SIB may be changed according to the policy of a provider or any other reasons.

If the communication environment with the mobile Internet 10 deteriorates in step S110, the controller 180 terminates the connection with the mobile Internet 10 and accesses the mobile communication network 20 (S120). Step S120 may be called an inter-heterogeneous handover from the mobile Internet 10 to the mobile communication network 20.

Handover mentioned in this document may refer to seamless handover.

After accessing the mobile communication network 20, the controller 180 continuously performs the particular data communication via the mobile communication network 20 (S130). Accordingly, the user can continuously receive the particular data communication ceaselessly.

The controller 180 periodically checks whether a connection with the mobile Internet 10 is available while performing the particular data communication via the mobile communication network 20 (S140).

In performing step S140, the controller 180 may periodically perform scanning operation on the mobile Internet 10.

The controller 180 determines whether or not a connection with the mobile Internet 10 is available according to the check result of step S140).

For example, the controller 180 checks a communication state with the mobile Internet 10 according to a periodical scanning result with respect to the mobile Internet 10, and if the checked communication state is good, the controller 180 may determine that a connection with the mobile Internet 10 is available.

When a connection with the mobile Internet 10 is available according to the determination result in step S150, the controller 180 terminates the connection with the mobile communication network 20 and accesses the mobile Internet 10 (S160).

In reverse of step S120, step S160 may correspond to handover from the mobile communication network 20 to the mobile Internet 10.

After accessing the mobile Internet 10, the controller 180 continuously performs the particular data communication via the mobile Internet 10 (S170).

According to the first exemplary embodiment as described above, the mobile Internet 10 has priority over the mobile communication network 20 for the data communication, thus reducing a network connection cost.

FIG. 5 is a flow chart illustrating the process of a method for performing data communication of a mobile terminal according to a second exemplary embodiment of the present invention.

The method for performing data communication according to the second exemplary embodiment of the present invention may be implemented in the system environment and the mobile terminal 100 as described above with reference to FIGS. 1 and 2. The method for performing data communication of the mobile terminal according to the second exemplary embodiment of the present invention and the operation of the mobile terminal 100 for implementing the same will now be described in detail.

With reference to FIG. 5, in a state that the mobile Internet 10 is accessed, the controller 180 activates an application using the mobile communication network 20 as a dedicated network (S200).

The application using the mobile communication network 20 as a dedicated network may be set and changed by the user (to be described in third and fourth exemplary embodiments of the present invention). Also, a particular application may be set to use the mobile communication network 20 as a dedicated network according to the policy of a developer of the particular application or a manufacturer of the mobile terminal 100, and thusly provided to the user.

When a particular application lays weight on a seamless stable service over a network speed in terms of the characteristics of its service, it preferably uses the mobile communication network 20 as a dedicated network. Of course, this can be changed according to a user setting as described above or as described later.

According to the activation of the application, the controller 180 may terminate the connection with the mobile Internet 10 and access the mobile communication network 20 (S210) to perform data communication using the activated application (S220).

The performing of data communication using the activated application may be made according to a user instruction or pre-set matter after the application is activated.

The controller 180 determines whether or not the activated application is terminated (S230). When the activated application is terminated, the controller 180 terminates the connection with the mobile communication network 20 and accesses the mobile Internet 10 (S240).

The terminating of the activated application may be made according to a user instruction or according to a pre-set matter such as a setting instructing to terminate the activated application after the data communication is performed.

According to the second exemplary embodiment, when the application using the mobile communication network 20 as a dedicated network is activated and the particular data communication is performed and then terminated, the network connection can be changed to the mobile Internet 10 which incurs a low network cost, so a generation of an unnecessary cost otherwise incurred by using the mobile communication network 20 can be fundamentally removed.

Figure 6:
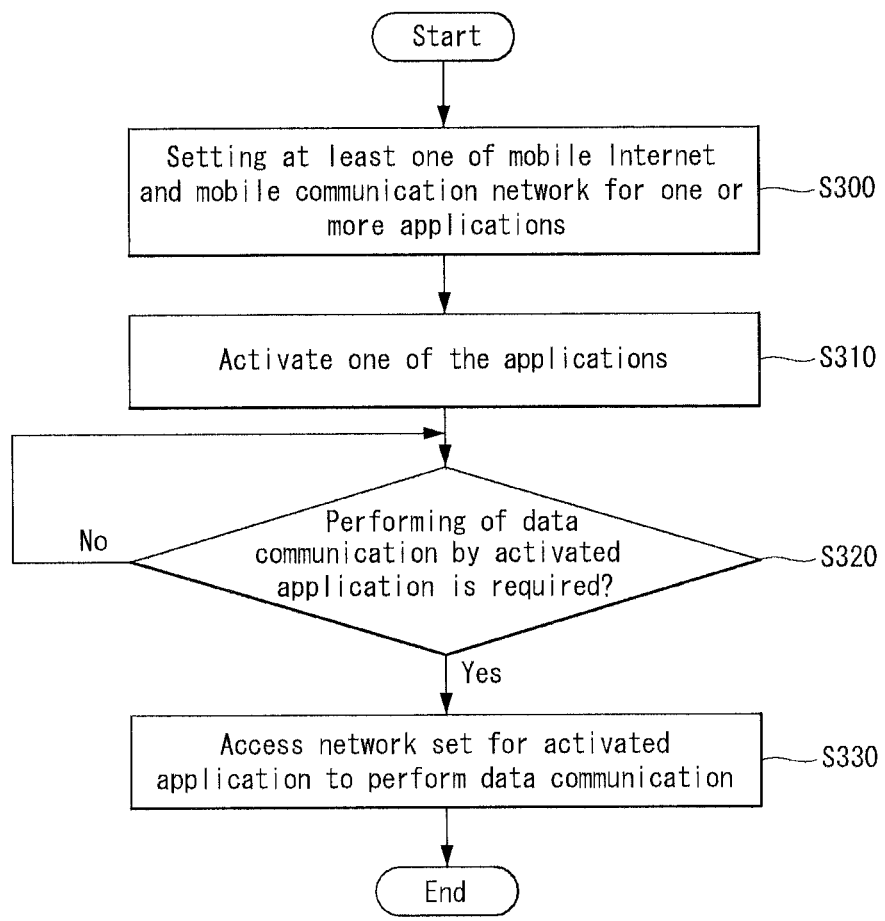
FIG. 6 is a flow chart illustrating the process of a method for performing data communication of a mobile terminal according to a third exemplary embodiment of the present invention.
Figure 7:
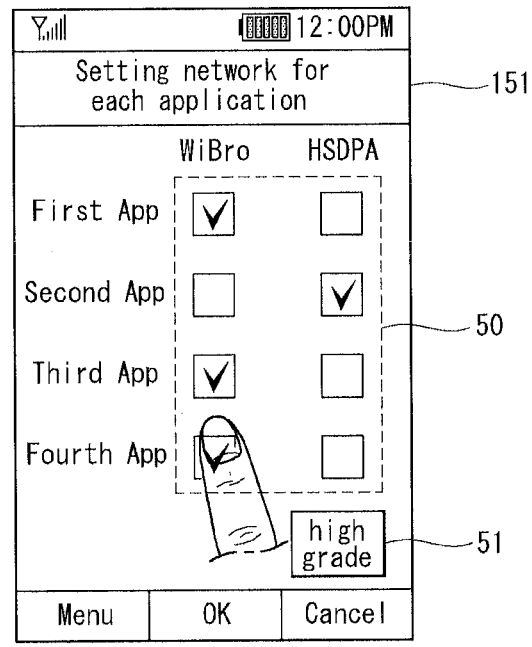
FIGS. 7 to 9 illustrate examples of user interfaces for implementing the method for performing data communication according to the third exemplary embodiment of the present invention.
Figure 8:
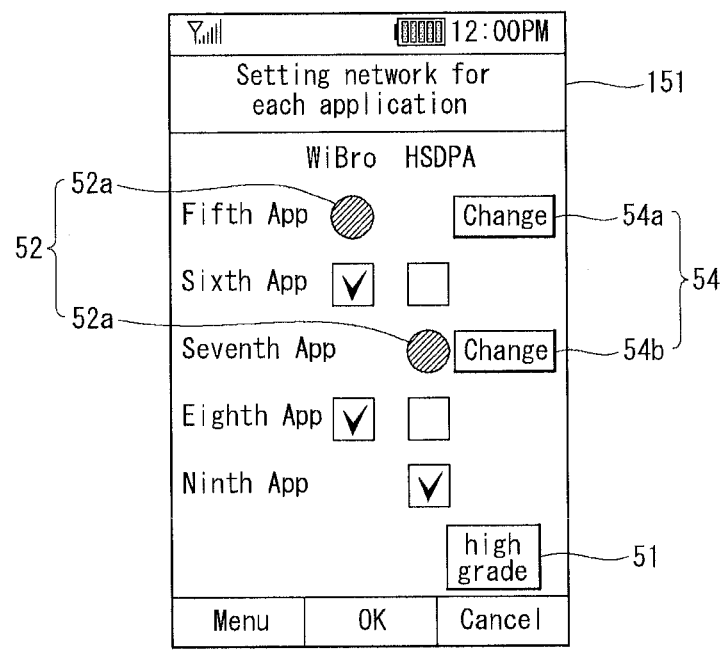
Figure 9:
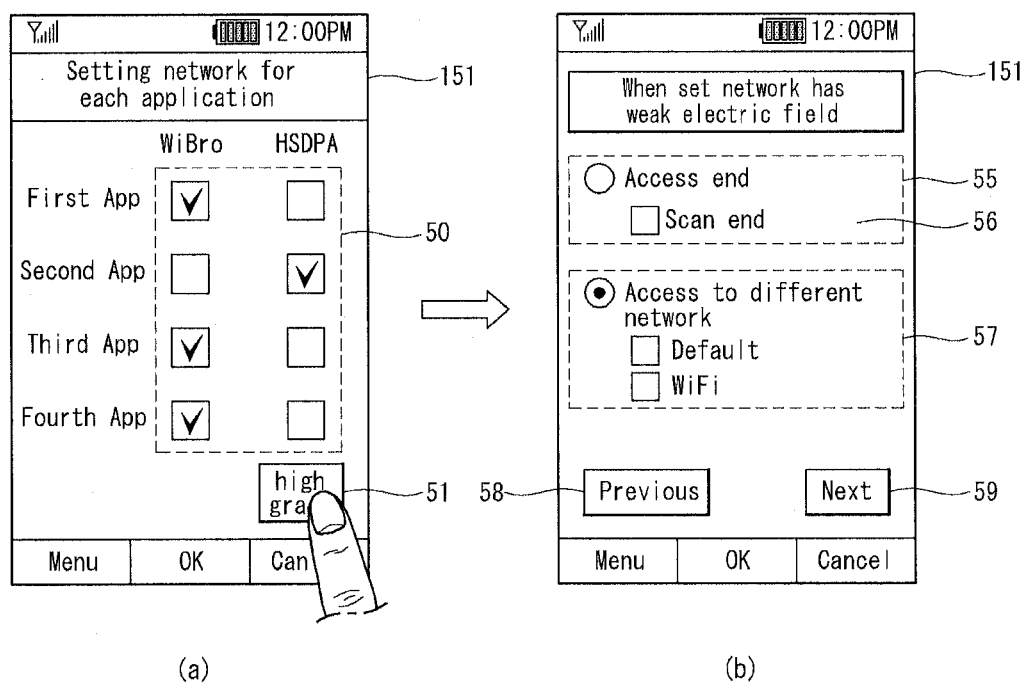

FIG. 6 is a flow chart illustrating the process of a method for performing data communication of a mobile terminal according to a third exemplary embodiment of the present invention. FIGS. 7 to 9 illustrate examples of user interfaces for implementing the method for performing data communication according to the third exemplary embodiment of the present invention.

The method for performing data communication according to the third exemplary embodiment of the present invention may be implemented in the system environment and the mobile terminal 100 as described above with reference to FIGS. 1 and 2. The method for performing data communication of the mobile terminal according to the third exemplary embodiment of the present invention and the operation of the mobile terminal 100 for implementing the same will now be described in detail.

With reference to FIG. 6, the controller 180 may set at least one of the mobile Internet 10 and the mobile communication network 20 for one or more applications providing a data communication function (S300).

For example, with reference to FIG. 7, with respect to the various, applications stored in the memory 160, the controller 180 may provide a user interface for setting a network to be accessed to perform data communication by the various applications.

The user interface illustrated in FIG. 7, check boxes 50 may be provided to select one of the mobile Internet 10 (WiBro) and the mobile communication network 20 (HSDPA) for each application. The user may set his desired network for each application by using the check boxes 50.

For example, in the example illustrated in FIG. 7, the mobile Internet 10 is set for 'first application (first App)', 'third application (third App)', and 'fourth application (fourth App)', and the mobile communication network 20 is set for a 'second application (second App)'.

FIG. 8 shows another example of the user interface for setting a network for applications.

The user interface illustrated in FIG. 8 provides the characteristics that a particular network is previously set as a default as well as the characteristics of the user interface illustrated in FIG. 7.

The default setting icons 52 illustrated in FIG. 8 indicate that particular networks are previously set for the applications corresponding to the icons 52. For example, in FIG. 8, a default setting icon 52a is marked at the mobile Internet 10 for a 'fifth application (fifth App)', and a default setting icon 52b is marks at the mobile communication network 20 for a 'seventh application (seventh App)'.

Meanwhile, even when the default setting icons 52 are marked, the user may change a network currently set as a default for a corresponding application and set it by selecting change icons 54. When the change icons 54 is selected, the controller 180 may immediately change the network currently set as a default or provide a graphical user interface for a network change.

Thus, the user may change the mobile Internet 10 currently set as a default to the mobile communication network 20 for the 'fifth application (fifth App)' and set it by selecting the first change icon 54a.

Also, the user may change the mobile communication network 20 currently set as a default for the 'seventh application (seventh App)' to the mobile Internet 10 and set it by selecting the second change icon 54b.

Meanwhile, the controller may set the mobile Internet 10 and the mobile communication network 20 for the one or more applications, and in this case, the controller 180 may give a connection priority to the mobile Internet 10 and the mobile communication network 20.

The connection priority may be given in various forms.

For example, the controller 180 may give a connection priority to the mobile Internet 10 for the first application, and may set such that, when communication environment of the mobile Internet 10 deteriorates to have a weak electric field, the mobile terminal accesses the mobile communication network 20 having a lower connection priority level than that of the mobile Internet 10.

FIG. 9 illustrates an example of a user interface for setting a processing method for a network connection when a communication environment of a network given a connection priority deteriorates.

With reference to FIG. 9(a), the user may select a high grade icon 51. As shown in FIG. 9(b), the controller 180 may enter a high grade setting screen image for a network setting according to the section of the high grade icon 51.

As shown in FIG. 9(b), when the currently set network has a weak electric field, the controller 180 may provide various user interfaces for setting a network connection processing method to the high grade setting screen image.

A connection end selection item 55 illustrated in FIG. 9(b), is a check item for setting to end communication with the currently set network when the currently set network has a weak electric field.

Here, a scan end selection item 56 is a check item for setting to end even a scanning operation with respect to the currently set network as well as end communication with the currently set network when the currently set network has a weak electric field.

A heterogeneous network connection select item 57 illustrated in FIG. 9(b) is a check item for setting to end communication with the currently set network and access a different network when the currently set network has a weak electric field. For example, as shown in FIG. 9(b), the heterogeneous network connection selection item 57 may include check boxes for setting to access one of the default network and WiFi.

Also, for example, the controller 180 may give a connection priority to the mobile communication network 20 for the second application, and may set such that, when a duration of the data communication and/or the amount of data communication exceeds a reference value while data communication is being performed via the mobile communication network 20, the mobile Internet 10 is connected (or accessed).

For example, it is assumed that the second application is a Web browser.

The controller 180 may set such that, in a state that the user enjoys Web surfing through the mobile communication network 20 by using the Web browser, when ten minutes of Web surfing time has lapsed, the Internet connection through the mobile communication network 20 is changed to an Internet connection via the mobile Internet 10.

Also, for example, the controller 180 may provide a connection priority to the mobile Internet 10 for the third application, and may set such that, whether to maintain the connection priority of the mobile Internet 10 is to be maintained or whether to give a connection priority to the mobile communication network 20 is determined by predicting a duration of the data communication and/or the amount of data communication at an early stage of the data communication.

For example, it is assumed that the third application is an application for receiving traffic information and map information via the Internet 30 and providing a road guidance.

When the user inputs a destination and instructs a route guidance from a current location to the destination, the controller 180 may predict time taken for reaching the destination and/or the amount of data communication required for reaching the destination.

If the destination arrival time duration and/or the required amount of data communication is large based on the prediction, the controller 180 may maintain the connection priority of the mobile Internet 10. Also, the controller 180 may set such that, when the destination arrival time and/or the required amount of data communication is small, the controller 180 disregards the connection priority of the mobile Internet 10 and accesses the mobile communication network 20 to perform required data communication.

Also, for example, it is assumed that the third application performs a function of accessing a particular website of the Internet 30 according to a pre-set condition and automatically downloading a particular program.

The controller 180 may acquire the capacity of the particular program through initial communication with the particular website and may set such that when the capacity is larger than a reference value, the controller 180 uses the mobile communication network 20, while when the capacity is smaller than the reference value, the controller 180 uses the mobile Internet 10.

Also, for example, the controller 180 may determine the connection priority by analyzing a usage pattern of the user with respect to a particular application. For example, the controller 180 may set such that, when an average usage time duration with respect to the fourth application is larger than a reference value, the controller 180 uses the mobile communication network 20, and when the average usage time duration with respect to the fourth application is smaller than a reference value, the controller 180 uses the mobile Internet 10.

The controller 180 may activate one of the applications (S310). As described above, the activation of the application may be made according to a user instruction or according to pre-set conditions.

The controller 180 determines whether or not data communication by the activated application is required (S320). When data communication is required, the controller may access a network set for the activated application to perform the required data communication (S330).

Figure 10:
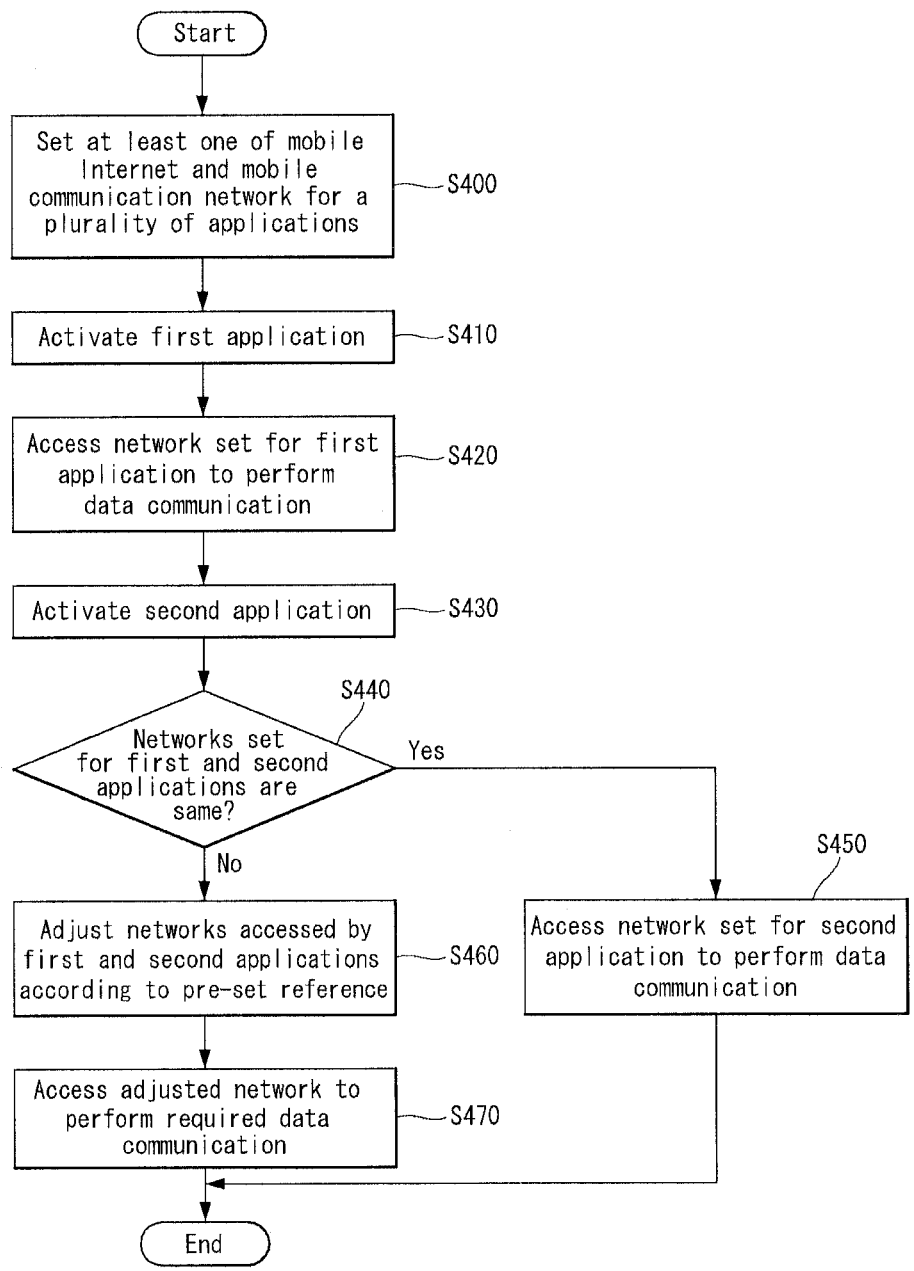
FIG. 10 is a flow chart illustrating the process of a method for performing data communication of a mobile terminal according to a fourth exemplary embodiment of the present invention.
Figure 11:
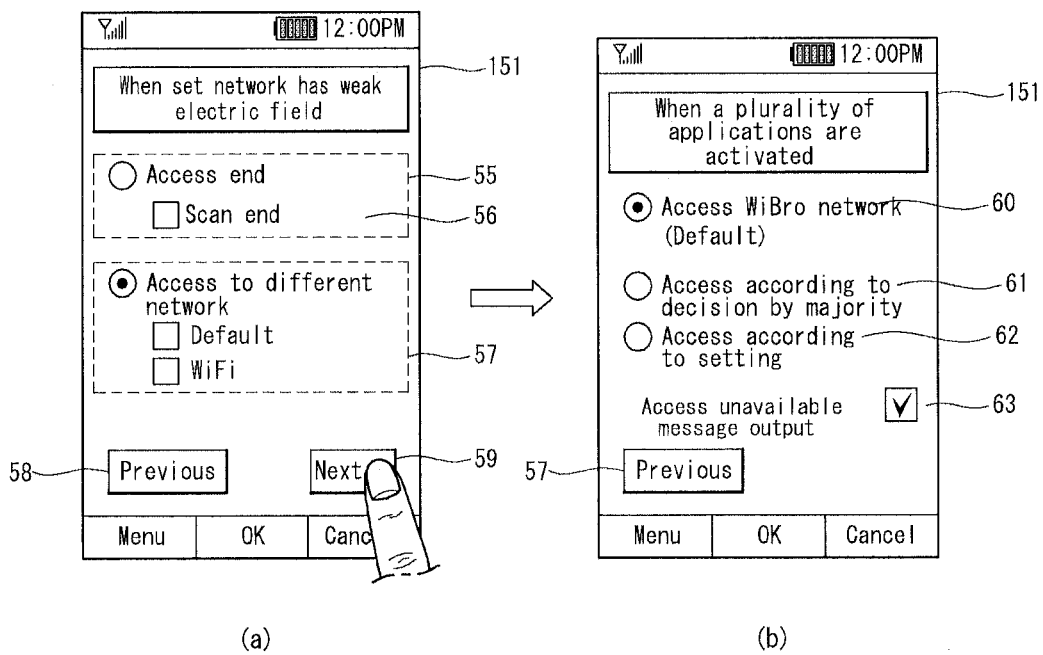
FIG. 11 illustrates an example of a user interface for implementing the method for performing data communication according to the fourth exemplary embodiment of the present invention.

FIG. 10 is a flow chart illustrating the process of a method for performing data communication of a mobile terminal according to a fourth exemplary embodiment of the present invention. FIG. 11 illustrates an example of a user interface for implementing the method for performing data communication according to the fourth exemplary embodiment of the present invention.

The method for performing data communication according to the fourth exemplary embodiment of the present invention may be implemented in the system environment and the mobile terminal 100 as described above with reference to FIGS. 1 and 2. The method for performing data communication of the mobile terminal according to the fourth exemplary embodiment of the present invention and the operation of the mobile terminal 100 for implementing the same will now be described in detail.

The fourth exemplary embodiment of the present invention, similar to the third exemplary embodiment of the present invention, relates to a method for processing a connection network when a plurality of applications simultaneously perform data communication.

With reference to FIG. 10, the controller 180 set at least one of the mobile Internet 10 and the mobile communication network 20 for the plurality of applications, respectively (S400). Step S400 may be performed based on the third exemplary embodiment of the present invention.

The controller 180 activates a first application among the plurality of applications (S410) and accesses a network set in step S400 for the first application to perform data communication (S420).

The controller 180 activates a second application among the plurality of applications (S430).

As the second application is activated, the controller 180 determines whether or not the network set for first application and a network set for the second application are the same (S440).

If the networks set for the first and second applications are the same according to the determination result of step s440, the controller 180 accesses the network set for the second application to perform data communication (S450).

Meanwhile, if the networks set for the first and second applications are different according to the determination result of step S440, the controller 180 adjusts the networks connected by the first and second applications according to a pre-set reference.

There may be various pre-set references. FIG. 11, a view for explaining the pre-set references, illustrates a user interface for providing the pre-set references to the user to allow the user to select them.

With reference to FIG. 11, when the user selects an icon 'Next' 59 from the high-grade screen image (See FIG. 9(*b*)) as shown in FIG. 11(*a*) and a plurality of applications are activated, the controller 180 may enter a different high-grade setting screen image for a network setting as shown in FIG. 11(*b*).

The controller 180 may provide various setting icons 60, 61, 62, and 63 to the different high-grade setting screen image illustrated in FIG. 11(*b*).

It may be set such that, when the user selects the first network setting icon 60 and if the plurality of applications simultaneously perform data communication, the mobile Internet 10 is connected (or accessed).

Also, it may be set such that, when the user selects the second network setting icon 61 and if the plurality of applications simultaneously perform data communication, a network which is the most set for the plurality of applications is connected (or accessed).

For example, it is assumed that the first to third applications are all activated and simultaneously perform data communication. With reference to FIG. 7, the mobile Internet 10 is set for the first and third applications, and the mobile communication network 20 is set for the second application. Accordingly, when the first to third applications are all activated to simultaneously perform data communication, the controller 180 accesses the mobile Internet 10.

Also, it may be set such that, when the user selects the third network setting icon 62, a network currently set for each of the plurality of applications is connected to perform data communication, respectively. Here, if a different network is set for each of the plurality of applications, the controller 180 uses both the wireless Internet module 113 and the mobile communication module 112 for data communication.

In FIG. 11, the user may select only one of the first to third network setting icons 60, 61, and 62.

Meanwhile the fourth network setting icon 63 may be selected together with one of the first to third network setting icons 60, 61, and 62.

It may be set such that, when the user selects the fourth network setting icon 63, the plurality of applications are all activate to perform data communication and, in this case, if a connection to a network set for at least one of the plurality of applications is not available, a connection unavailable message is outputted.

For example, with reference to FIG. 8, it is assumed that while data communication is being performed by the seventh application for which the mobile communication network 20 is set as a dedicated network, data communication by the fifth application for which the mobile Internet 10 is set as a dedicated network is to be performed.

In this case, the controller 180 may output a message indicating that a connection to the mobile Internet 10 is not available or a message indicating that the fifth application cannot be used through the display unit 151 and/or the audio output unit 152.

The controller 180 accesses an adjusted network (or an agreed network) in step S460 to perform data communication respectively by the first and second applications (S470).

According to the third and fourth exemplary embodiments, when a user preference with respect to a network and a network communication environment deteriorates, a particular network among the heterogeneous networks may be set for an application in consideration of various conditions such as a duration of data communication, the amount of data communication, and the like.

Accordingly, when downloading of a large capacity data such as VOD or FTP is required, a network connection incurring a high cost is prevented, and thus, unnecessary cost can be prevented from incurring. Also, because a network can be set according to a user preference, the user preference can be satisfied to its maximum level.

Figure 12:
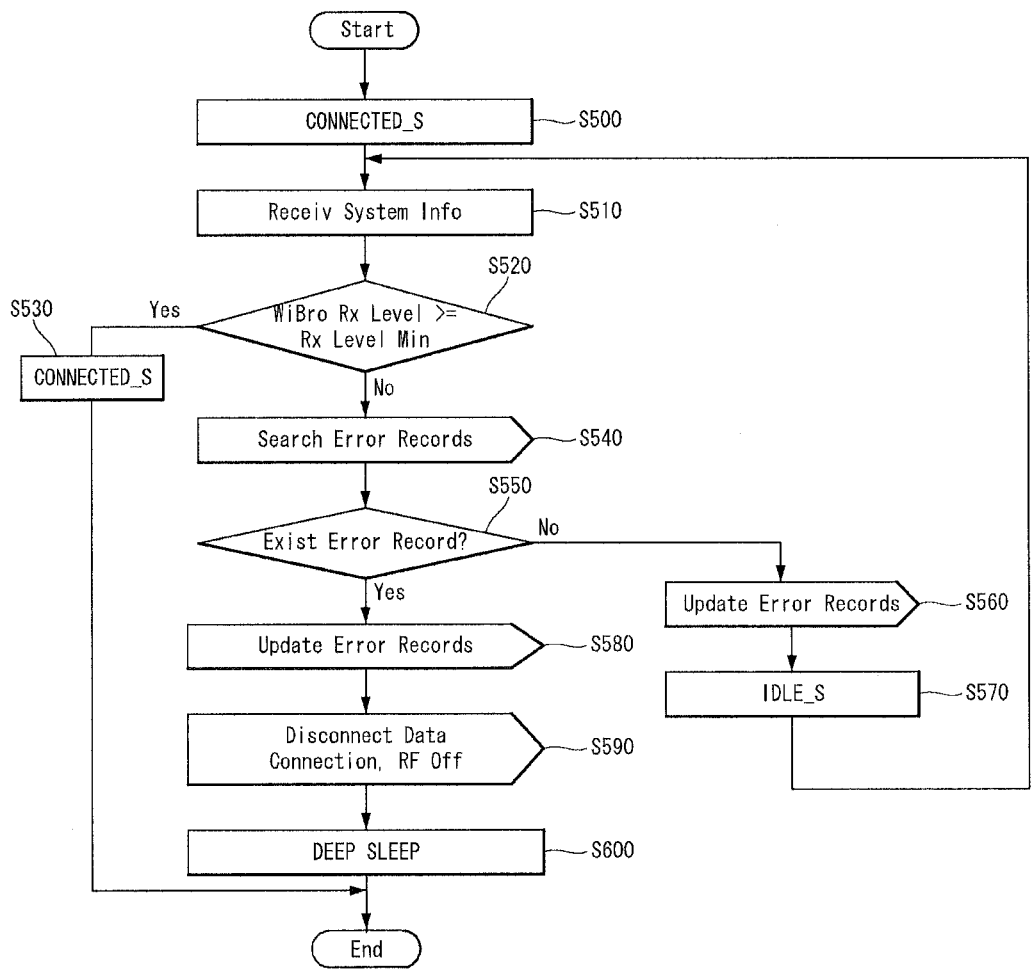
FIG. 12 is a flow chart illustrating the process of a method for performing data communication of a mobile terminal according to a fifth exemplary embodiment of the present invention.

FIG. 12 is a flow chart illustrating the process of a method for performing data communication of a mobile terminal according to a fifth exemplary embodiment of the present invention.

The method for performing data communication according to the fifth exemplary embodiment of the present invention may be implemented in the system environment and the mobile terminal 100 as described above with reference to FIGS. 1 and 2. The method for performing data communication of the mobile terminal according to the fifth exemplary embodiment of the present invention and the operation of the mobile terminal 100 for implementing the same will now be described in detail.

With reference to FIG. 12, the controller 180 accesses the mobile Internet 10 (S500) and receives system information via the mobile communication network 20 (S510).

The controller 180 determines whether or not a communication environment with the mobile Internet 10 has deteriorated based on the system information or based on the communication environment with the mobile Internet 10 (S520).

When the communication environment with the mobile Internet 10 has not deteriorated according to the determination result of step S520, the controller 180 maintains the connection with the mobile Internet 10 (S530).

When the communication environment with the mobile Internet 10 has deteriorated according to the determination result of step S520, the controller 180 checks whether a current location of the mobile terminal 100 is in an area registered as a communication poor area of the mobile Internet 10 (S540).

Here, the controller 180 may search (or check) a communication poor area database that manages information regarding the communication poor area by using terminal location information using a cell ID of the mobile communication network 20. The communication poor area database may be stored in the memory 160 or may be provided from a particular server existing in the Internet 30.

The controller 180 determines whether or not the current location of the mobile terminal 100 is in an area registered as a communication poor area of the mobile Internet 10 to the communication poor area database according to the search result of step S540 (S550).

If the current location is not registered in the communication poor area database according to the determination result of step S550, the controller 180 registers the current location to the communication poor area database (S560) and terminates the connection with the mobile Internet 10 (S570).

In step S570, the controller 180 may terminate only the data communication with the mobile Internet 10 and periodically attempt a location registered to the mobile Internet 10. When the location registration fails until such time as a certain time period lapses, the controller 180 may turn off power of the wireless Internet module 113 for performing data communication with the mobile Internet 10.

Meanwhile, if the current location has not been registered to the communication poor, area database according to the determination result of step S550, the controller 180 may terminate the data communication with the mobile Internet 10 and periodically attempt a location registration to the mobile Internet 10. If the location registration fails until such time as a certain time period lapses, the controller 180 may register the current location to the communication poor area database. And the, the controller 180 may turn off power of the wireless Internet module 113.

If the current location has been registered to the communication poor area database according to the determination result of step S550, the controller 180 updates the communication poor area database with respect to the information regarding the current location (S580).

And then, the controller 180 may terminate the connection with the mobile Internet 10 and turn off power of the wireless Internet module 113 (S590).

The controller 180 maintains a deep sleep mode (S600). The deep sleep mode refers to a state in which the controller 180 does not attempt a location registration to the mobile Internet 10.

Meanwhile, as the connection with the mobile Internet 10 is terminated, the controller 180 may access the mobile communication network 20 to continuously perform required data communication via the mobile communication network 20.

The controller 180 may not check whether or not a connection to the mobile Internet 10 is available until when the data communication is completed. For example, the controller 180 may not perform the location registration or a scanning operation.

When the data communication via the mobile communication network 20 is completed, the controller 180 may turn on power of the wireless Internet module 113 and attempt a connection to the mobile Internet 10.

According to the fifth exemplary embodiment of the present invention, when the communication environment with the mobile Internet 10 deteriorates like the case where the communication environment with mobile Internet 10 has a weak electric field, an attempt of accessing the mobile Internet 10 is minimized to thus prevent an unnecessary operation. Also, because the communication poor area with the mobile Internet 10 is managed and used, thereby minimizing an attempt of accessing the mobile Internet 10.

Figure 13:
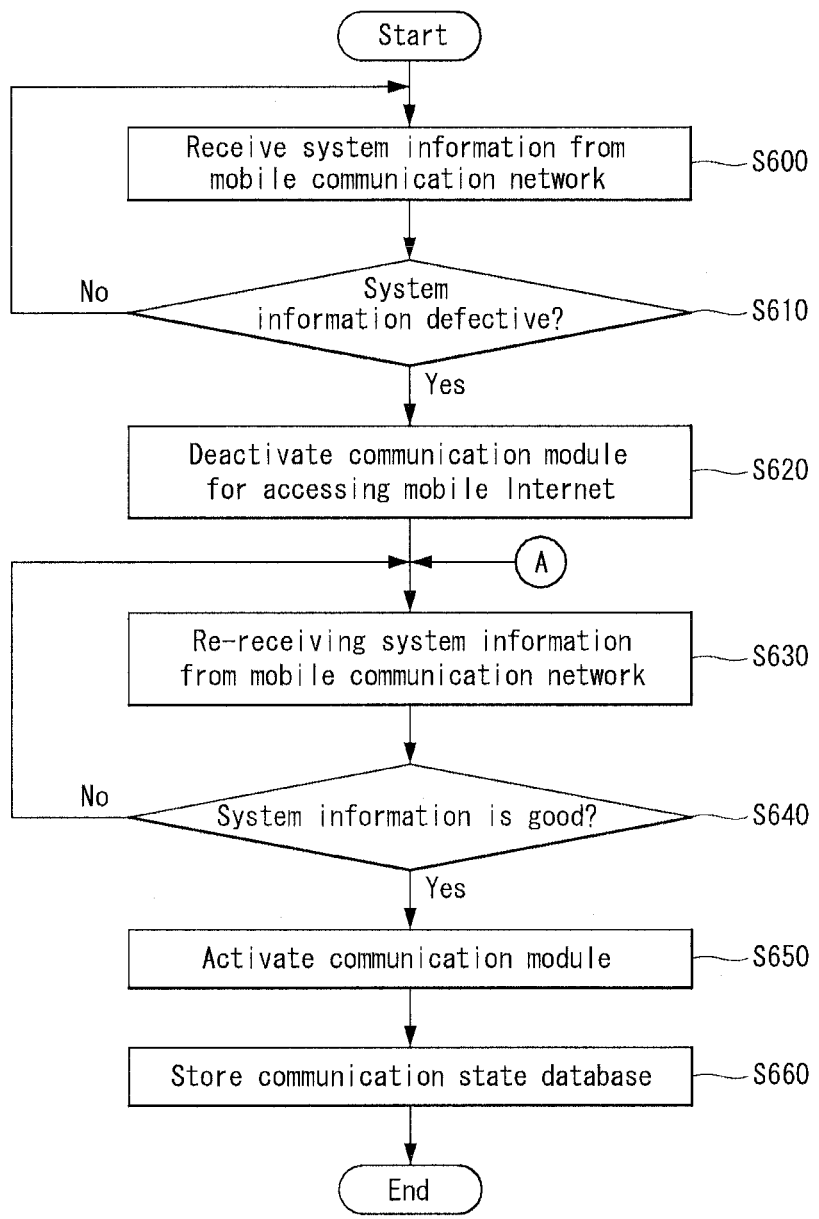
FIG. 13 is a flow chart illustrating the process of a method for managing data communication of a mobile terminal according to a sixth exemplary embodiment of the present invention.

FIG. 13 is a flow chart illustrating the process of a method for managing data communication of a mobile terminal according to a sixth exemplary embodiment of the present invention.

The method for managing data communication according to the sixth exemplary embodiment of the present invention may be implemented in the system environment and the mobile terminal 100 as described above with reference to FIGS. 1 and 2. The method for managing data communication of the mobile terminal according to the sixth exemplary embodiment of the present invention and the operation of the mobile terminal 100 for implementing the same will now be described in detail.

With reference to FIG. 13, the controller 180 receives system information including information regarding whether or not a current location of the mobile terminal 100 is in a connection available area of the mobile Internet 10, via the mobile communication module 112 from the mobile communication network 20 (S600). As mentioned above, the example (SIB) of the system information is illustrated in FIG. 4.

The controller 180 determines whether or not the received system information is defective (S610).

The controller 180 may determine whether or not the received system information is defective based on a pre-set first reference.

The pre-set first reference includes a case where the communication environment with the mobile communication network 20 deteriorates and a case where an error is detected from the received system information.

For example, if the strength of a signal received from the mobile communication network 20 is lower than a reference value, the controller 180 may determine that the communication environment with the mobile communication network 20 has deteriorates and determine that the received system information is defective.

Also, for example, if receiving of the system information is unstable like the case where the system information fails to receive although it is supposed to be periodically received, the controller 180 may determine that the received system information is defective.

Also, for example, if a WiBro indicator 40 included in the received SIB information has an error such as a CRC error, the controller 180 may determine that an error is detected from the received system information and determine that the received system information is defective.

When the received system information is defective according to the determination result of step S610, the controller 180 deactivates the wireless Internet module 113 for accessing the mobile Internet 10 (S620).

Here, the controller 180 may turn off power of the wireless Internet module 113 for accessing the mobile Internet 10.

The controller 180 may set such that step S620 is performed without consideration of the communication environment of the mobile Internet 10, namely, regardless of whether or not the communication environment of the mobile Internet 10 is good or poor.

Also, the controller 180 may perform step S620 in consideration of the communication environment of the mobile Internet 10.

For example, when the communication environment of the mobile Internet 10 is good, the controller 180 may maintain the activation of the wireless Internet module 113, and when the communication environment of the mobile Internet 10 deteriorates below a pre-set second reference, the controller 180 may deactivate the wireless Internet module 113.

The pre-set second reference may include any one of a received signal strength indication (RSSI) and a carrier-to-interference-plus-noise-ratio (CINR) with respect to the mobile Internet 10.

Also, for example, when the communication environment of the mobile Internet 10 deteriorates below the second reference, the controller 180 may periodically repeat activating and deactivating the wireless Internet module.

When the wireless Internet module 113 is activated, a scanning operation may be performed on the mobile Internet 10.

While the activation and deactivation of the wireless Internet module 113 is periodically repeated, when the communication environment of the mobile Internet 10 is recovered to be good higher than the second reference, the controller 180 may maintain the activated of the wireless Internet module 113.

The controller 180 may provide an indicator indicating activation/deactivation of the wireless Internet module 113 on an indicator area of the display unit 151.

The indicator may be provided in various forms. For example, the indicator may be provided in the form of an antenna indicator, a signal strength indicator, other icons, and the like.

After deactivating the wireless Internet module 113, the controller 180 may control the indicator to indicate the deactivated state of the wireless Internet module 113.

The controller 180 may receive the system information from the mobile communication network 20 (S630). The system information may be periodically or intermittently received from the mobile communication network 20. The transmission and reception of the system information may follow a communication protocol regarding the mobile communication network 20.

The controller 180 determines whether or not the re-received system information is good (S640). When the re-received system information is good, the controller 180 activates the wireless Internet module 113 (S650).

Meanwhile, the controller 180 may store or register a communication state of at least one of the mobile communication network 20 and the mobile Internet 10 regarding a current area of the mobile terminal 100 in or to a communication state database (S660).

The current area of the mobile terminal 100 may acquire through information received from the mobile communication network 20 or through the location information module 115.

The communication state database may be stored in the memory 160 or may be managed by a server existing outside the mobile terminal 100.

When the communication state database is stored in the server, the controller 180 may transmit information regarding a communication state of the current area to the server via the wireless communication unit 110.

The controller 180 may perform step S660 according to pre-set conditions.

For example, the controller 180 may set such that, after the wireless Internet module 113 is activated in step S650, when the communication state with the mobile Internet 10 is good while the communication state with the mobile communication network 20 is poor, step S660 is performed.

Also, for example, the controller 180 may set such that, regardless of the activation of the wireless Internet module 113, when the communication state with the mobile Internet 10 is good while the communication state with the mobile communication network 20 is poor, step S660 is performed.

Also, for example, the controller 180 may set such that, regardless of the activation of the wireless Internet module 113 and the communication state of the mobile Internet 10, when the communication state with the mobile communication network 20 is poor, step S660 is performed.

Figure 14:
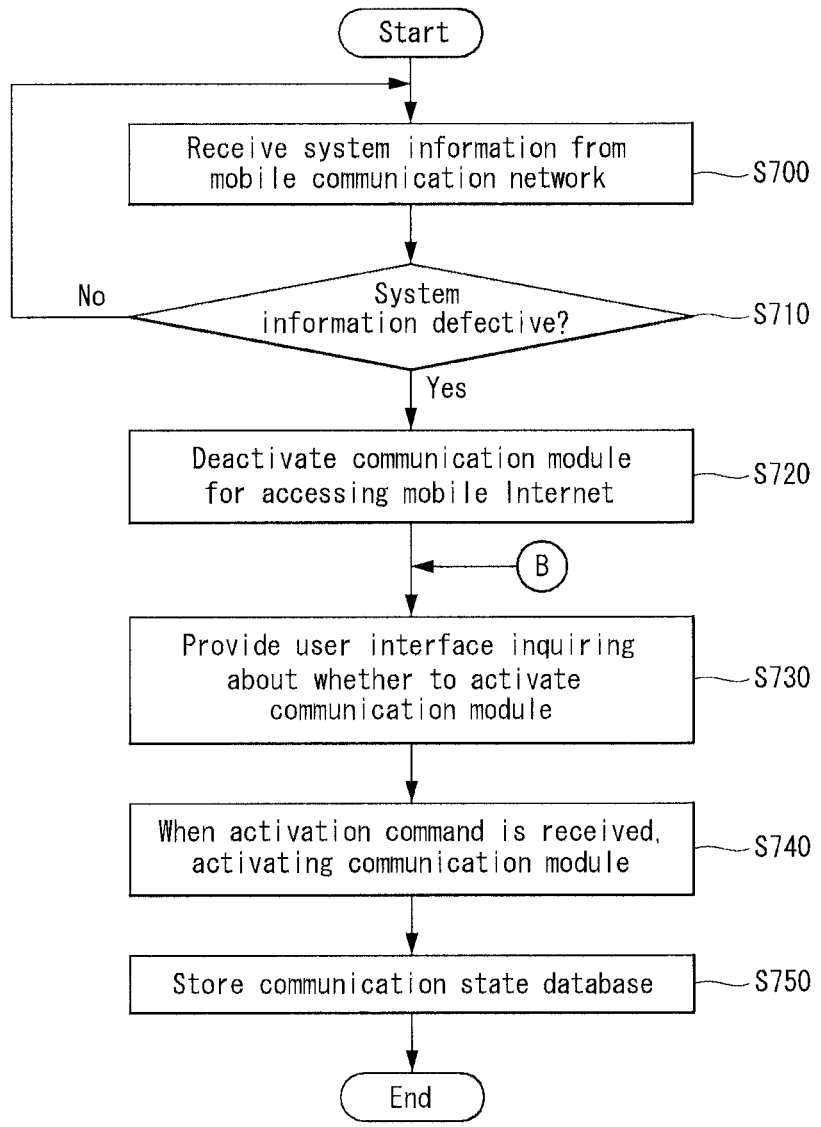
FIG. 14 is a flow chart illustrating the process of a method for managing data communication of a mobile terminal according to a seventh exemplary embodiment of the present invention.

FIG. 14 is a flow chart illustrating the process of a method for managing data communication of a mobile terminal according to a seventh exemplary embodiment of the present invention.

The method for managing data communication according to the seventh exemplary embodiment of the present invention may be implemented in the system environment and the mobile terminal 100 as described above with reference to FIGS. 1 and 2. The method for managing data communication of the mobile terminal according to the seventh exemplary embodiment of the present invention and the operation of the mobile terminal 100 for implementing the same will now be described in detail.

With reference to FIG. 14, the controller 180 receives system information including information regarding whether a current location of the mobile terminal 100 is in an accessible area of the mobile Internet 10 via the mobile communication module 112 from the mobile communication network 20 (S700).

The controller 180 determines whether or not the received system information is defective (S710).

When the received system information is defective according to the determination result of step S710, the controller 180 deactivates the wireless Internet module 113 for accessing the mobile Internet 10 (S720).

Steps S700 to S720 correspond to steps S600 to S620 in the sixth exemplary embodiment of the present invention as described above. Thus, a detailed description of steps S700 to S720 will be omitted.

After deactivating the wireless Internet module 113, the controller 180 may provide a user interface inquiring about whether to activate the wireless Internet module 113 (S730).

For example, in case where the display unit 151 is implemented in the form of a touch screen, when the user touches an indicator indicating activation/deactivation of the wireless Internet module 113, the controller 180 may provide the user interface.

Also, the user may search a menu structure provided in the mobile terminal 100 to allow the user interface to be provided.

When a command signal for activating the wireless Internet module 113 is received through the provided user interface, the controller 180 may activate the wireless Internet module (S740).

Also, the controller 180 may store or register a communication state of at least one of the mobile communication network 20 and the mobile Internet 10 regarding a current area of the mobile terminal 100 in or to the communication state database (S750).

Step S750 corresponds to step S660 of the sixth exemplary embodiment of the present invention as described above, so a detailed description thereof will be omitted.

According to the sixth and seventh exemplary embodiments of the present invention, when receiving of the system information is unstable but it cannot be accurately determined whether or not the current area is an area where a service can be received from the mobile Internet 10, the wireless Internet module 113 is deactivated, thus preventing unnecessary power consumption.

In particular, when even the communication environment with the mobile Internet 10 is unstable as well as when the receiving of the system information is unstable, the controller 180 may continuously attempt registration to the mobile Internet 10. Also, in this case, the wireless Internet module 113 can be deactivated to prevent an unnecessary increase in the power consumption.

Figure 15:
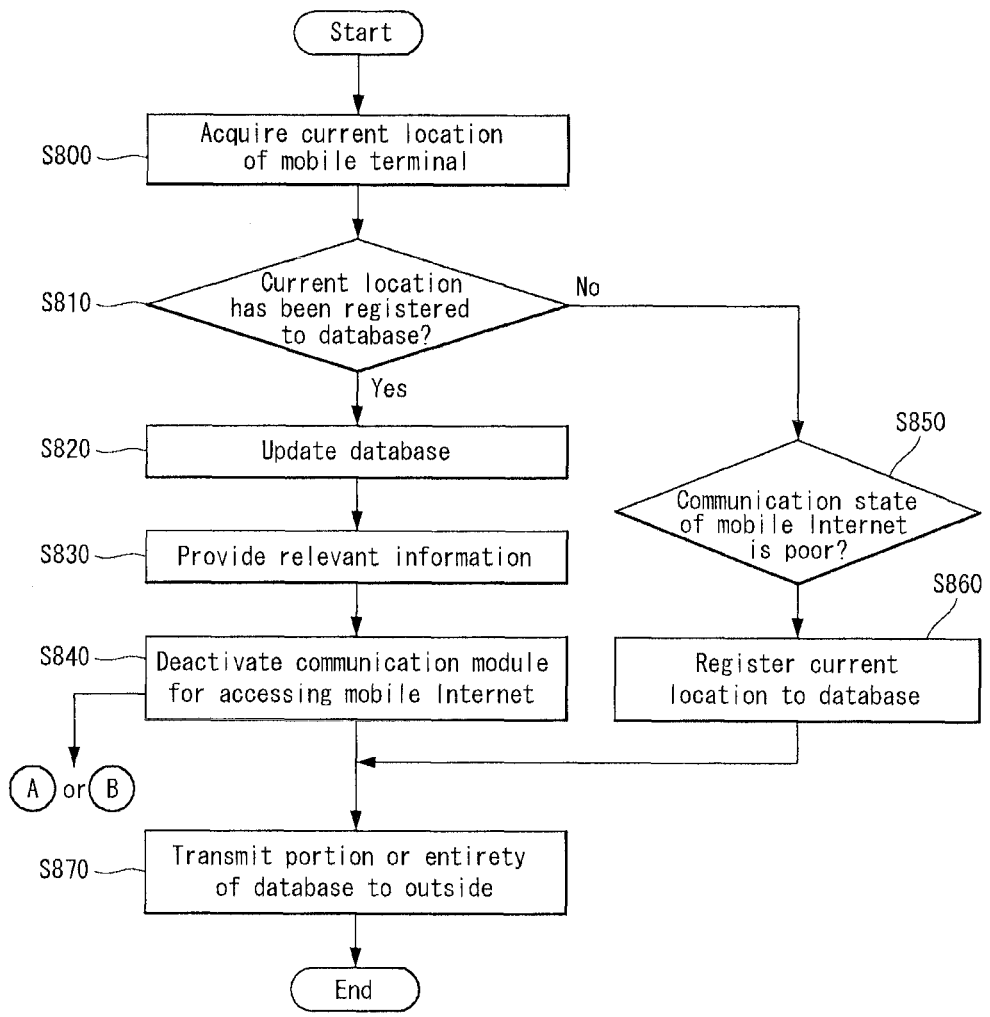
FIG. 15 is a flow chart illustrating the process of a method for managing data communication of a mobile terminal according to an eighth exemplary embodiment of the present invention.

FIG. 15 is a flow chart illustrating the process of a method for managing data communication of a mobile terminal according to an eighth exemplary embodiment of the present invention.

The method for managing data communication according to the eighth exemplary embodiment of the present invention may be implemented in the system environment and the mobile terminal 100 as described above with reference to FIGS. 1 and 2. The method for managing data communication of the mobile terminal according to the eighth exemplary embodiment of the present invention and the operation of the mobile terminal 100 for implementing the same will now be described in detail.

With reference to FIG. 15, the controller 180 acquires a current location of the mobile terminal 100 (S800).

The controller 180 may acquire the current location by using information received from the mobile communication network 200 or by using the location information module 115.

The controller 180 determines whether or not the acquired current location is in an area registered to a database that manages a communication poor area of at least one of the mobile Internet 10 and the mobile communication network 20 with reference to the database (S810).

The database may be stored in the memory 160 or in an external particular server. Also, the database may be periodically updated.

When the database is stored in the external server, the controller 180 may transmit the information regarding the acquired current area to the external server to inquire about whether or not the communication poor area corresponding to the acquired current area information exists in the database.

The external server may transmit a response to the inquiry to the mobile terminal 100.

The controller 180 may receive the response to the inquiry and determine whether or not the acquired current location is in an area registered to the database based on the response.

Also, the database may store and manage even a communication poor area of the mobile Internet 10 as well as the communication poor area of the mobile communication network 20.

Also, the database may store the information regarding the communication poor area of at least one of the mobile communication network 20 and the mobile Internet 10 and other information such as a field strength such as the strength of a reception signal in the communication poor area, together.

When the acquired current location is in an area registered to the database according to the determination result of step S810, the controller 180 updates the database (S820), provides relevant information to the user (S830), and deactivates the wireless Internet module 113 for accessing the mobile Internet 10 (S840).

In step S820, information other than the acquired current location may be updated on the database.

The relevant information may include at least one of a communication state of the mobile communication network 20, the communication poor area of the mobile communication network 20, and deactivation of the wireless Internet module 113.

For example, in step S830, the controller 180 may inform the user about the fact that it enters a weak electric field area of the mobile communication network 20 and that power of the wireless Internet module 113 will be thus turned off, before deactivating the wireless Internet module 113, at a present time, or sometime after.

Here, the controller 180 may display the relevant information on the display unit 151 or output it via the audio output module 152.

Also, at the same time when the relevant information is provided, the controller 180 may provide a user interface inquiring about whether to turn off power of the wireless Internet module 113.

Through the power off inquiry user interface, the user may check power-off of the wireless Internet module 113 or may transfer an instruction of maintaining an ON state of the wireless Internet module to the controller 180.

In the eighth exemplary embodiment of the present invention, the deactivated wireless Internet module 113 can be activated in the same manner as described above in the sixth and seventh exemplary embodiment of the present invention.

For example, in case of activating the wireless Internet module 113 according to the sixth exemplary embodiment of the present invention, the controller 180 may activate the wireless Internet module 113 based on the system information (e.g., the SIB illustrated in FIG. 4) received from the mobile communication network 20.

Also, for example, in case of activating the wireless Internet module 113 according to the seventh exemplary embodiment of the present invention, the controller 180 may activate the wireless Internet module 113 based on a command signal received via the user interface inquiring about whether to activate the wireless Internet module 113.

When the acquired current location is not in an area registered to the database according to the determination result of step S810, the controller 180 determines whether or not a communication state with the mobile communication network 20 is poor. When the communication state with the mobile communication network 20 is poor, the controller 180 may register the acquired current location to the database. And then, the controller 180 provides the relevant information to the user (S830) and deactivates the wireless Internet module 113 for accessing the mobile Internet 10 (S840).

When the acquired current location is not in an area registered to the database according to the determination result of step S810, the controller 180 determines whether or not a communication state with the mobile Internet 10 is poor (S850).

For example, the controller 180 may determine a communication state with the mobile Internet 10 based on at least one of a received signal strength indication (RSSI) and a carrier-to-interference-plus-noise-ratio (CINR) with respect to the mobile Internet 10.

When the communication state with the mobile Internet 10 is poor according to the determination result of step S850, the controller 180 registers the acquired current location to the database (S860).

Here, the controller 180 may register the acquired current location as a communication poor area of the mobile Internet 10 and/or the mobile communication network 20 to the database.

Meanwhile, the controller 180 may transmit a portion or the entirety of the database to an external terminal or an external server according to a user instruction or a pre-set reference (S870).

For example, the controller 180 may transmit a portion or the entirety of the database to a different terminal via the short-range communication module 114 according to a user instruction.

Also, for example, the controller 180 may transmit a portion or the entirety of the database to the different terminal, in the form of a short message service (SMS), a multimedia message service (MMS), or an e-mail, according to a user instruction.

The different terminal may receive the database and use in such a manner as in the exemplary embodiments of the present invention.

Also, for example, the controller 180 may transmit a portion or the entirety of the database to a particular server connected with the Internet 30 according to a user instruction or a pre-set reference.

The particular server may receive a portion or the entirety of the database and include the received database in a broadcast signal to broadcast it, thus transmitting the same to a plurality of unspecified or specified terminals.

The plurality of unspecified or specified terminals may receive the database and use it in such a manner as in the exemplary embodiments of the present invention.

Besides, the database stored in the mobile terminal 100 can be transmitted to other terminals according to various transmission methods.

As mentioned in the description of the sixth exemplary embodiment of the present invention, the mobile terminal 100 may receive information regarding whether or not a current location is in an area where a connection with the mobile Internet 10 is available, from the mobile communication network 20.

According to the eighth exemplary embodiment of the present invention, even without using the system information received from the mobile communication network 20, the controller 180 can effectively quickly determine whether or not the current location is in the accessible area of the mobile Internet 10 by using the database stored in the mobile terminal 100 or the external server. Thus, an unnecessary scanning operation on the mobile Internet 10 or unnecessary registration attempting operation to the mobile Internet 10 can be fundamentally avoided, thus preventing unnecessary power consumption.

Figure 16:
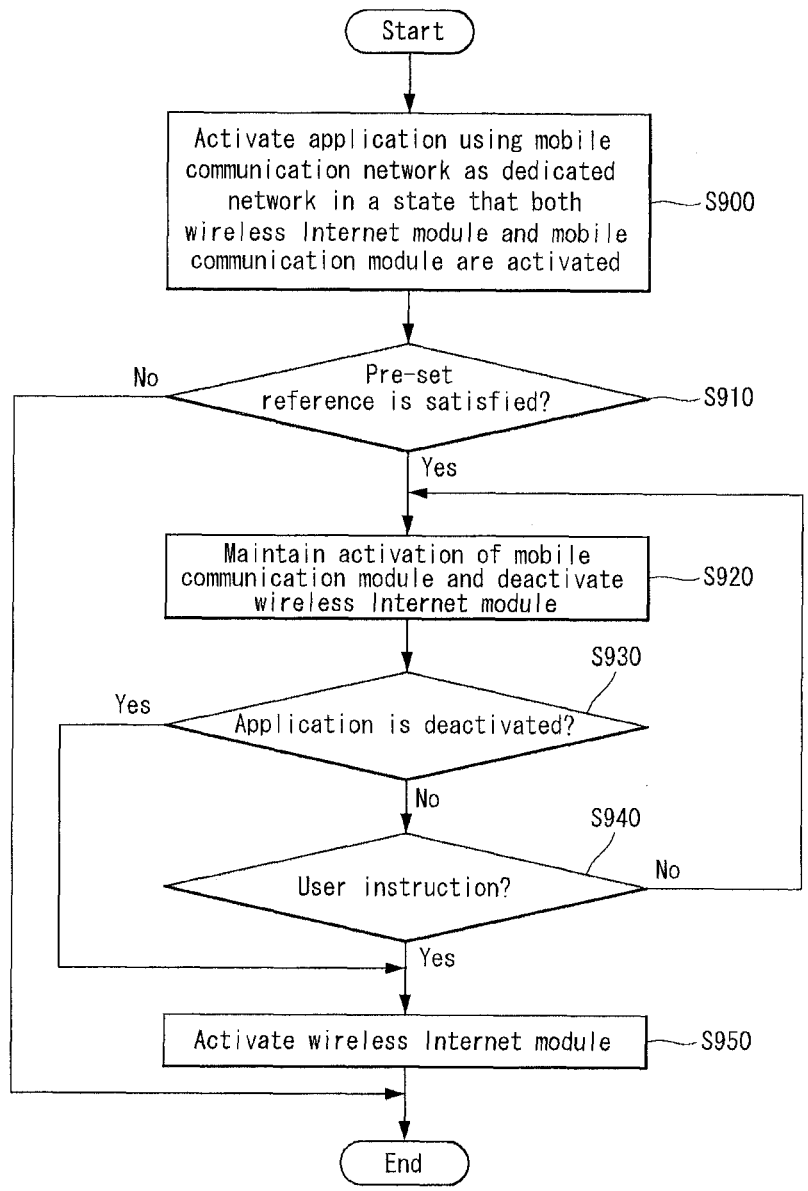
FIG. 16 is a flow chart illustrating the process of a method for managing data communication of a mobile terminal according to a ninth exemplary embodiment of the present invention.

FIG. 16 is a flow chart illustrating the process of a method for managing data communication of a mobile terminal according to a ninth exemplary embodiment of the present invention.

The method for managing data communication according to the ninth exemplary embodiment of the present invention may be implemented in the system environment and the mobile terminal 100 as described above with reference to FIGS. 1 and 2. The method for managing data communication of the mobile terminal according to the ninth exemplary embodiment of the present invention and the operation of the mobile terminal 100 for implementing the same will now be described in detail.

With reference to FIG. 16, in a state that both the wireless Internet module 113 for accessing the mobile Internet 10 and the mobile communication module 112 for accessing the mobile communication network 20 are activated, the controller 180 activates a particular application set to use the mobile communication network 20 as a dedicated network (S900).

The application using the mobile communication network 20 as a dedicated network may be set and changed by the user. Also, the particular application may be set to use the mobile communication network 20 as a dedicated network according to the policy of a developer of the particular application or a manufacturer of the mobile terminal 100, and thusly provided to the user.

When a particular application lays weight on a seamless stable service over a network speed in terms of the characteristics of its service, it preferably uses the mobile communication network 20 as a dedicated network. Of course, this can be changed according to a user setting as described above.

According to the activation of the application, the controller 180 determines whether or not a pre-set reference is satisfied (S910).

The pre-set reference refers to a condition for deactivating the wireless Internet module 113 (to be described). The pre-set reference will be described in detail later with reference to tenth to fourteenth exemplary embodiments of the present invention.

When the pre-set reference is satisfied according to the determination result of step S910, the controller 180 maintains the activation of the mobile communication module 112 and deactivates the wireless Internet module 113 (S920).

Here, the controller 180 may turn off power of the wireless Internet module 113.

The controller 180 may determine whether or not the activated application is deactivated (S930).

When the activate application is deactivated according to the determination result of step S930, the controller 180 activates the wireless Internet module 113 (S950).

When the activated application is not deactivated according to the determination result of step S930, the controller determines whether or not an instruction for activating the wireless Internet module 113 is received from the user (S940). When the user instruction is received, the controller 180 activates the wireless Internet module 113 (S950), and if there is no user instruction, the controller 180 may maintain the deactivated state of the wireless Internet module 113.

Referring to the related art, in a state that both the mobile communication module 112 and the wireless Internet module 113 included in the mobile terminal 100 are activated, when an application using the mobile communication network 20 such as a WCDMA network is activated, the connected state with the mobile Internet 10 via the wireless Internet module 113 is maintained.

In particular, in the related art, in order to maintain a connection standby state (namely, a state in which a server of the mobile Internet 10 is accessed and an IP is allocated) with respect to the mobile Internet 10, the mobile terminal 100 maintains power of the wireless Internet module 113, unnecessarily consuming power.

However, in the ninth exemplary embodiment of the present invention, power of the wireless Internet module 113 is turned off under the certain condition through the foregoing process, thus preventing unnecessary power consumption.

The tenth to fourteenth exemplary embodiments of the present invention (to be described) disclose various examples of the pre-set reference determined in step S910 of the ninth exemplary embodiment of the present invention as described above.

The pre-set reference determined in step S910 may include at least one of a setting with respect to the particular application activated in step S900, an estimated time of data communication to be performed by the particular application, a usage pattern of the user with respect to the particular application, and a communication state of the mobile Internet 10.

Namely, the controller 180 may deactivate the wireless Internet module 120 in consideration of at least one of the references disclosed as examples in the tenth to fourteenth exemplary embodiments of the present invention (to be described).

The examples of the pre-set reference determined in step S910 will now be described.

Figure 17:
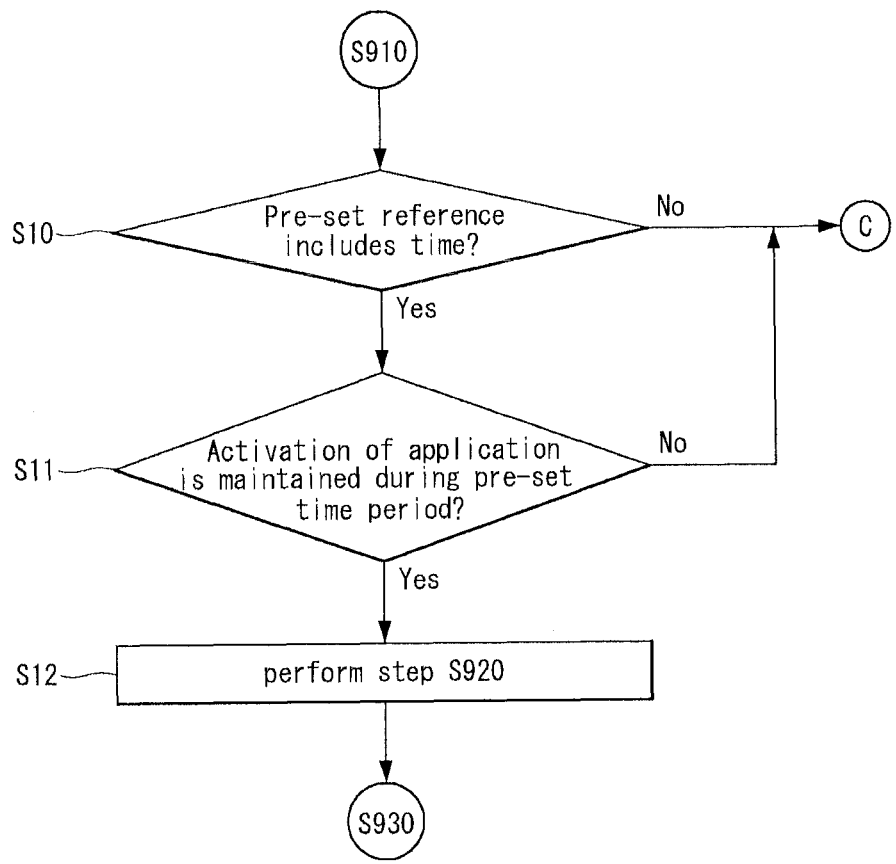
FIG. 17 is a flow chart illustrating the process of a method for managing data communication of a mobile terminal according to a tenth exemplary embodiment of the present invention.
Figure 18:
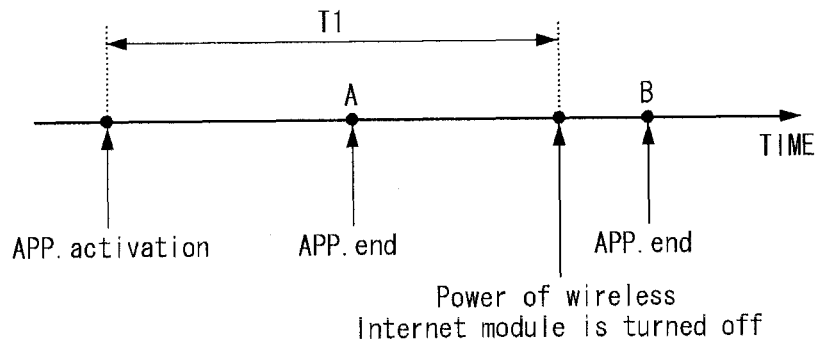
FIG. 18 is a drawing for explaining the tenth exemplary embodiment of the present invention.

FIG. 17 is a flow chart illustrating the process of a method for managing data communication of a mobile terminal according to a tenth exemplary embodiment of the present invention. FIG. 18 is a drawing for explaining the tenth exemplary embodiment of the present invention.

The method for managing data communication according to the tenth exemplary embodiment of the present invention may be implemented in the system environment and the mobile terminal 100 as described above with reference to FIGS. 1 and 2. The method for managing data communication of the mobile terminal according to the tenth exemplary embodiment of the present invention and the operation of the mobile terminal 100 for implementing the same will now be described in detail.

With reference to FIG. 17, the controller 180 determines whether or not 'time' is included in the pre-set reference (S10).

When 'time' is included in the pre-set reference according to the determination result of step S10, the controller 180 determines whether or not the activated application is maintained to be activated during a pre-set time period (S11). When the activated application is maintained to be activated during the pre-set time period, the controller 180 performs step S920 of deactivating the wireless Internet module 113 (S12).

With reference to FIG. 18, 'T1' illustrated in FIG. 18 shows an example of a pre-set time. In a state that the application is activated, when the application is deactivated (at a point 'A') while the activation of the application is maintained during the time period 'T1', the activation of the wireless Internet module 113 can be maintained.

Also, at a time point when the activation time of the application passes 'T1', the controller 180 may deactivate the wireless Internet module 113.

When the application is terminated at a point 'B' in FIG. 18, so it is deactivated, the controller 180 may activate the wireless Internet module 113 again as described above in the ninth exemplary embodiment of the present invention.

According to the tenth exemplary embodiment of the present invention, in a state that the application set to use the mobile communication network 20 as a dedicated network is activated, if the activation of the application is maintained until when a certain time lapses, the wireless Internet module 113 is turned off so as to be deactivated. Thus, unnecessary power consumption by the wireless Internet module 113 can be basically prevented.

Figure 19:
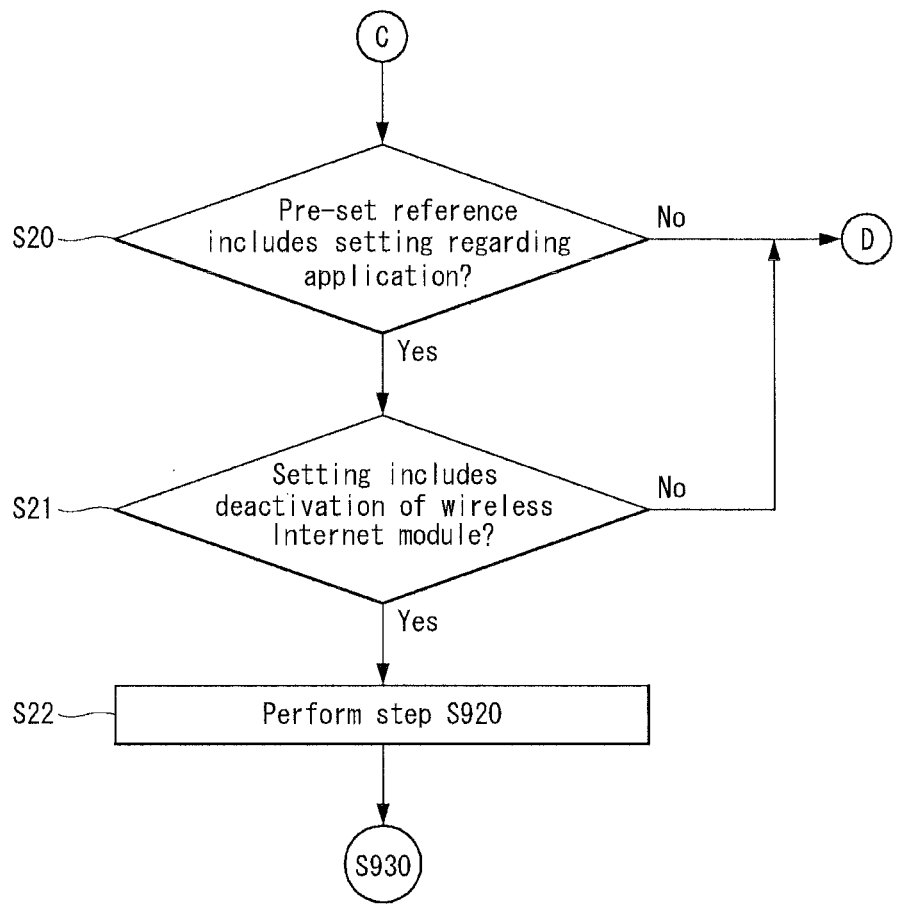
FIG. 19 is a flow chart illustrating the process of a method for managing data communication of a mobile terminal according to an eleventh exemplary embodiment of the present invention.
Figure 20:
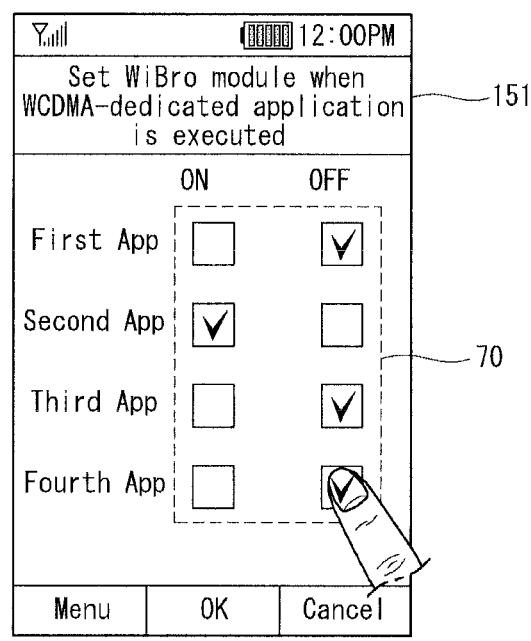
FIG. 20 illustrates an example of a user interface according to an exemplary embodiment of the present invention.

FIG. 19 is a flow chart illustrating the process of a method for managing data communication of a mobile terminal according to an eleventh exemplary embodiment of the present invention. FIG. 20 illustrates an example of a user interface according to an exemplary embodiment of the present invention.

The method for managing data communication according to the eleventh exemplary embodiment of the present invention may be implemented in the system environment and the mobile terminal 100 as described above with reference to FIGS. 1 and 2. The method for managing data communication of the mobile terminal according to the eleventh exemplary embodiment of the present invention and the operation of the mobile terminal 100 for implementing the same will now be described in detail.

With reference to FIG. 19, the controller 180 determines whether or not a 'setting' with respect to the activated application is included in the pre-set reference (S20).

When the 'setting' is included in the pre-set reference according to the determination result of step S20, the controller 180 determines whether or not it is set such that the wireless Internet module 113 is deactivated or power of the wireless Internet module 113 is turned off after the application is activated (S21). The controller 180 performs step S920 according to the determination result of step S21 (S22).

FIG. 20 illustrates a user interface for setting a processing method of the wireless Internet module 113 when the application set to use the mobile communication network 20 as a dedicated network is executed.

As shown in FIG. 20, when various applications set to use the WCDMA network as a dedicated network are executed, the controller 180 may provide a user interface for setting ON/OFF of the wireless Internet module 113.

The user may select ON/OFF of the wireless Internet module 113 for each application by using a check box 70 included in the user interface.

According to the eleventh exemplary embodiment of the present invention, when the application set to use the mobile communication network 20 as a dedicated network is activated, the wireless Internet module 113 is deactivated according to a previous setting with respect to the application. Thus, an unnecessary power consumption by the wireless Internet module 113 can be fundamentally prevented.

Figure 21:
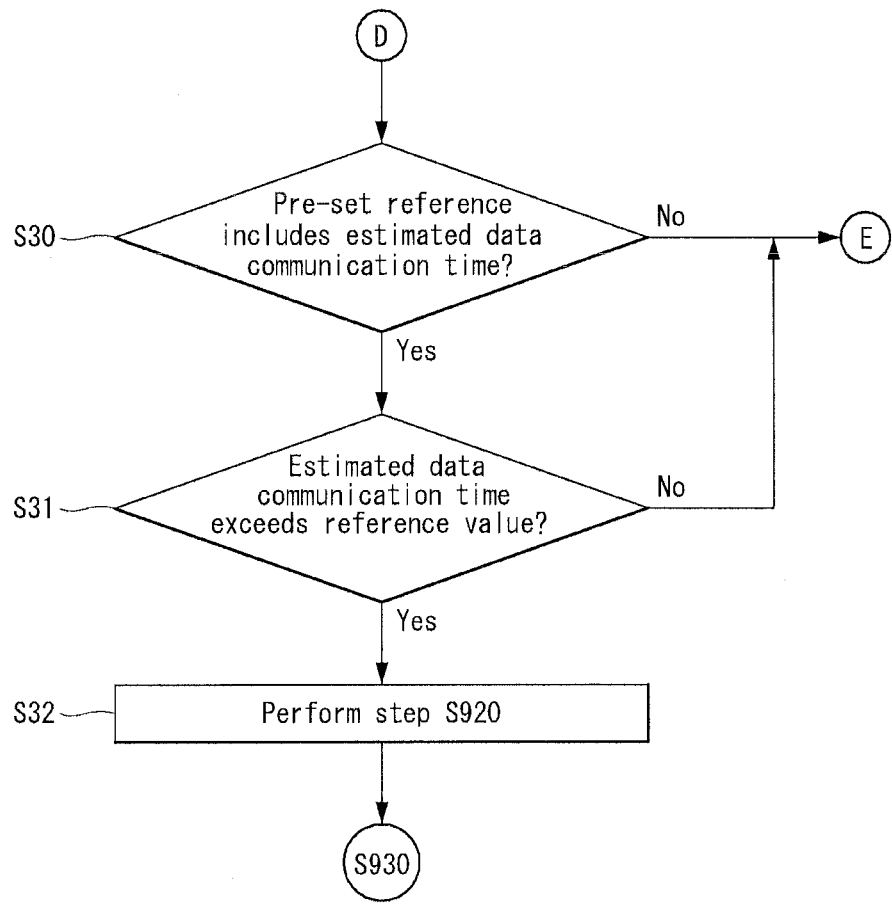
FIG. 21 is a flow chart illustrating the process of a method for managing data communication of a mobile terminal according to a twelfth exemplary embodiment of the present invention.

FIG. 21 is a flow chart illustrating the process of a method for managing data communication of a mobile terminal according to a twelfth exemplary embodiment of the present invention.

The method for managing data communication according to the twelfth exemplary embodiment of the present invention may be implemented in the system environment and the mobile terminal 100 as described above with reference to FIGS. 1 and 2. The method for managing data communication of the mobile terminal according to the twelfth exemplary embodiment of the present invention and the operation of the mobile terminal 100 for implementing the same will now be described in detail.

With reference to FIG. 21, the controller 180 determines whether or not an 'estimated data communication time' with respect to the activated application is included in the pre-set reference (S30).

The activated application may accompany data communication via the mobile communication network 20.

The data communication via the mobile communication network 20 may start simultaneously when or after the application is activated according to a setting, or may start according to a user instruction after the application is activated.

When or before the data communication starts, the controller 180 may estimate time required for the data communication.

For example, it is assumed that the activated application receives traffic information and map information via the Internet 30 and provides a route guidance.

When the user inputs a destination and instructs a route guidance from a current location to the destination, the controller 180 may predict time taken for reaching the destination and/or the amount of data communication required for reaching the destination.

The controller 180 may acquire an estimated time required for the data communication based on the destination arrival time and/or the amount of data communication.

If the estimated data communication time' is included in the pre-set reference according to the determination result of step S30, the controller 180 determines whether or not the acquired estimated data communication time exceeds the pre-set reference value after the application is activated (S31). When the acquired estimated data communication time exceeds the pre-set reference value according to the determination result of step S31, the controller 180 performs step S920 (S32).

According to the twelfth exemplary embodiment of the present invention, when the application set to use the mobile communication network 20 as a dedicated network is activated, an estimated time required for the data communication through the activated application is predicted in advance and the wireless Internet module 113 is deactivated based on the predicted estimated time. Thus, an unnecessary power consumption by the wireless Internet module 113 can be fundamentally prevented.

Figure 22:
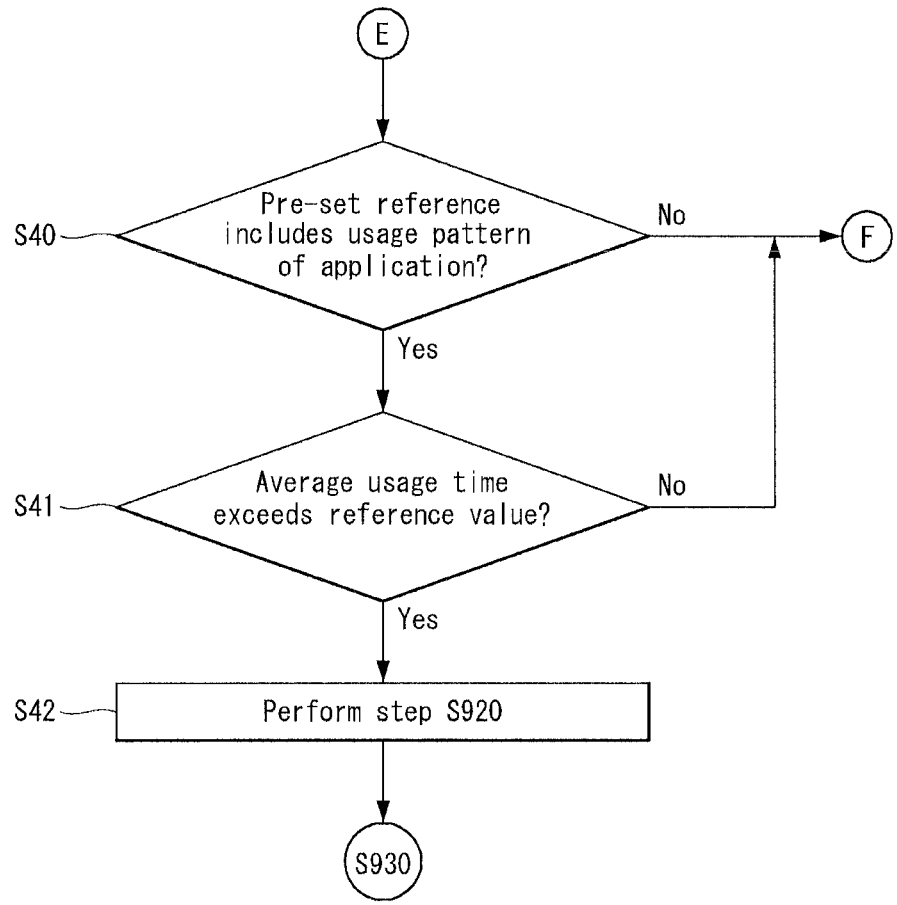
FIG. 22 is a flow chart illustrating the process of a method for managing data communication of a mobile terminal according to a thirteenth exemplary embodiment of the present invention.
Figure 23:
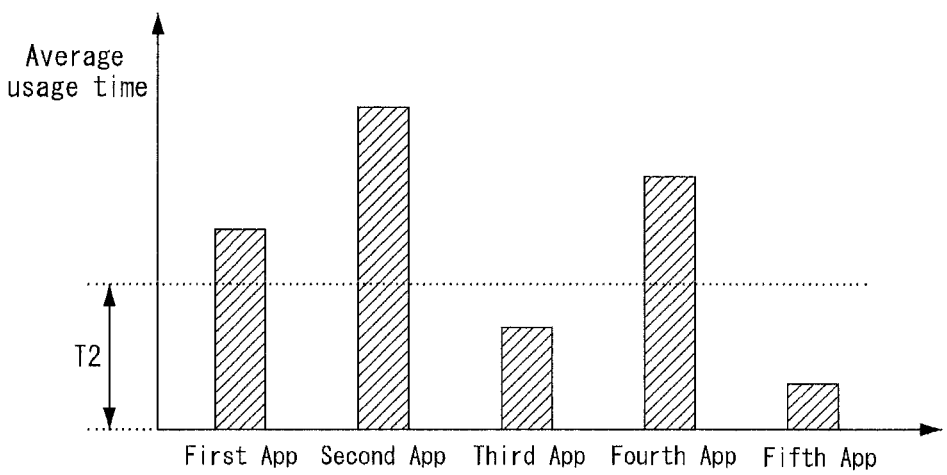
FIG. 23 is a drawing for explaining the thirteenth exemplary embodiment of the present invention.

FIG. 22 is a flow chart illustrating the process of a method for managing data communication of a mobile terminal according to a thirteenth exemplary embodiment of the present invention. FIG. 23 is a drawing for explaining the thirteenth exemplary embodiment of the present invention.

The method for managing data communication according to the thirteenth exemplary embodiment of the present invention may be implemented in the system environment and the mobile terminal 100 as described above with reference to FIGS. 1 and 2. The method for managing data communication of the mobile terminal according to the thirteenth exemplary embodiment of the present invention and the operation of the mobile terminal 100 for implementing the same will now be described in detail.

With reference to FIG. 22, the controller 180 determines whether or not a 'usage pattern' with respect to the activated application is included in the pre-set reference (S40).

The controller 180 may analyze a usage pattern of the user with respect to the particular application and store the same in the memory.

For example, a usage pattern with respect to the particular application such as the number of uses of the particular application, frequency of use during a certain period, an average usage time when the particular application is used one time, and the like, may be analyzed and stored.

When the 'usage pattern' is included in the pre-set reference according to the determination result of step S40, the controller 180 determines whether or not an average usage time stored with respect to the activated application exceeds a reference value in a state that the application is activated (S41). When the average usage time exceeds the reference value, the controller 180 performs step S920 (S42).

FIG. 23 is a graph of an average usage time over various applications. In FIG. 23, 'T2' is a reference value set for deactivating the wireless Internet module 113.

With reference to FIG. 23, when the average usage time of the first application ('First App'), the second application ('Second App'), and the fourth application ('Fourth App')

exceeds the reference value T2, so when they are activated, the wireless Internet module 113 is deactivated.

Also, with reference to FIG. 23, the average usage time of the third application ('Third App') and fifth application ('Fifth App') does not exceed the reference value T2, so when they are activated, the wireless Internet module 113 is maintained to be activated, rather than being deactivated.

According to the thirteenth exemplary embodiment of the present invention, when the application set to use the mobile communication network 20 as a dedicated network is activated, the wireless Internet module 113 is deactivated based on the usage pattern such as the average usage time, and the like, with respect to the activated application, thus fundamentally preventing unnecessary power consumption.

Figure 24:
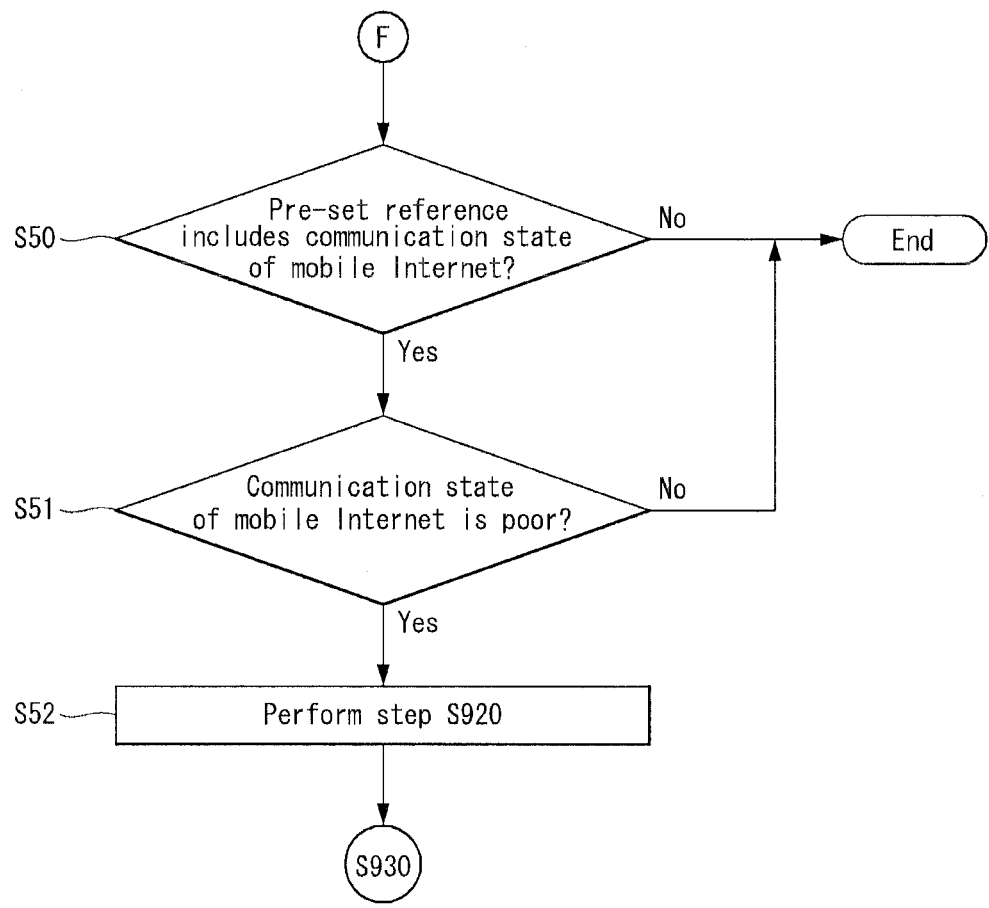
FIG. 24 is a flow chart illustrating the process of a method for managing data communication of a mobile terminal according to a fourteenth exemplary embodiment of the present invention.

FIG. 24 is a flow chart illustrating the process of a method for managing data communication of a mobile terminal according to a fourteenth exemplary embodiment of the present invention.

The method for managing data communication according to the fourteenth exemplary embodiment of the present invention may be implemented in the system environment and the mobile terminal 100 as described above with reference to FIGS. 1 and 2. The method for managing data communication of the mobile terminal according to the thirteenth exemplary embodiment of the present invention and the operation of the mobile terminal 100 for implementing the same will now be described in detail.

With reference to FIG. 24, the controller 180 determines whether or not a 'communication state' of the mobile Internet 10 is included in the pre-set reference (S50).

When the 'communication state' is included in the pre-set reference according to the determination result of step S50, the controller 180 determines whether or not a communication state of the mobile Internet 10 is poor (S51). When the communication state of the mobile Internet 10 is poor according to the determination result of step S51, the controller 180 performs step S920 (S52).

For example, when received signal strength indication (RSSI) and a carrier-to-interference-plus-noise-ratio (CINR) received from the mobile Internet 10 is lower than a pre-set reference value, the controller 180 may determine that a communication environment with the mobile Internet 10 is poor.

Also, for example, when errors of system information and various other information received from the mobile Internet 10 increases, the controller 180 may determine that the communication environment with the mobile Internet 10 has deteriorated to be poor.

As described above, FIG. 4 illustrates the example of a system information block (SIB), system information received from the mobile communication network via the mobile communication module 112. The SIB illustrated in FIG. 4 includes information (i.e., WiBro indicator 40) indicating whether an area is available for communication with the mobile Internet 10. Also, as mentioned above, the SIB illustrated in FIG. 4 is merely illustrative.

When receiving of the SIB is unstable or when there is an error in the WiBro indicator 40, the controller 180 may determine that the communication environment with the mobile Internet 10 has deteriorated.

According to the fourteenth exemplary embodiment of the present invention, in a state that the application set to use the mobile communication network 20 as a dedicated network is activated, when the communication environment with the mobile Internet 10 is poor like the case where the communication environment with the mobile Internet 10 has a weak electric field or the like, the wireless Internet module 113 is deactivated, so unnecessary power consumption by the wireless Internet module 113 can be fundamentally prevented.

In particular, when the electric field strength of the mobile Internet 10 is weak, if the mobile terminal 100 continuously scans the mobile Internet 10 via the wireless Internet module 113, power consumption is likely to increase. However, according to the fourteenth exemplary embodiment of the present invention, in such a case, power of the wireless Internet module 113 is turned off, thus preventing power consumption.

Figure 25:
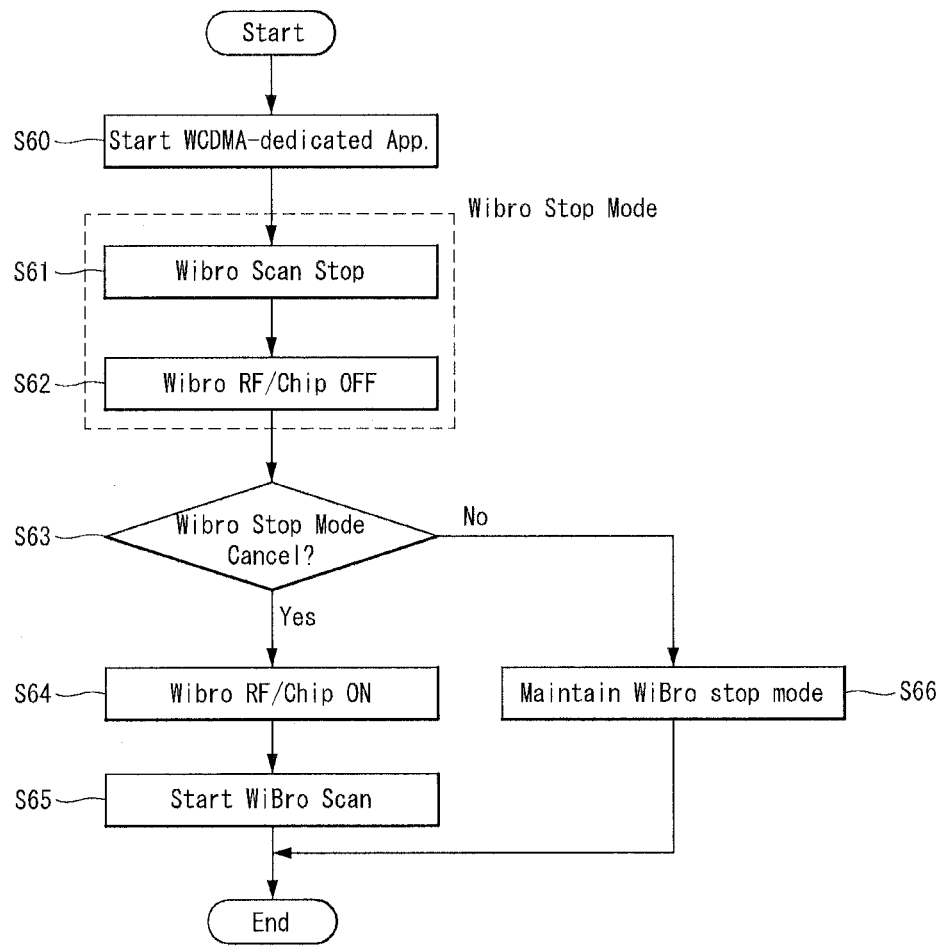
FIG. 25 is a flow chart illustrating the process of activating a wireless Internet module according to an exemplary embodiment of the present invention.

FIG. 25 is a flow chart illustrating the process of activating a wireless Internet module according to an exemplary embodiment of the present invention. The example of step S950 illustrated in FIG. 16 will now be described in detail.

With reference to FIG. 25, the controller 180 starts the application using the WCDMA network as a dedicated network (S60).

The controller 180 stops scanning on the WiBro network (S61) and turns off power of the wireless Internet module 113 for accessing the WiBro network (S62). The state in which steps S61 and S62 have been performed will be referred to as a 'WiBro Stop Mode', hereinafter.

The controller 180 determines whether or not the 'WiBro Stop Mode' is released (S63). Step S63 may include at least one of step S930 and step S940.

When the 'WiBro Stop Mode' is released according to the determination result of step S63, the controller 180 turns on the wireless Internet module 113 (S64) and starts scanning on the mobile Internet 10 via the wireless Internet module (S65).

If the 'WiBro Stop Mode' is not released according to the determination result of step S63, the controller 180 may maintain the 'WiBro Stop Mode' (S66).

The method for performing data communication of the mobile terminal and the method for managing data communication of the mobile terminal according to the exemplary embodiments of the present invention may be recorded in a computer-readable recording medium, as a program to be executed in a computer.

The method for performing data communication of the mobile terminal and the method for managing data communication of the mobile terminal according to the exemplary embodiments of the present invention may be executed by software. When the method for performing data communication of the mobile terminal and the method for managing data communication of the mobile terminal according to the exemplary embodiments of the present invention are executed by software, the constituents of the exemplary embodiments of the present invention are code segments executing required operations. The program or code segments may be stored in a processor-readable medium or transmitted by a computer data signal combined with a carrier from a transmission medium or a communication network.

A computer-readable recording medium includes any kind of recording device storing data that can be read by a computer system. The computer-readable recording device includes a ROM, a RAM, a CD-ROM, a DVD-ROM, a DVD-RAM, a magnetic tape, a floppy disk, a hard disk, an optical data storage device, and the like. Also, codes which are distributed in computer devices connected by a network and can be read by a computer in a distributed manner are stored and executed in the computer-readable recording medium.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a wireless Internet module configured to access a mobile Internet according to a standard protocol of the IEEE 802.16 group;
a mobile communication module configured to access a mobile communication network that includes at least one of a wideband code division multiple access (WCDMA) and a high speed downlink packet access (HSDPA); and
a controller configured to determine whether or not a current location is an area that has been registered as a communication poor area of the mobile Internet by searching a database for managing information regarding a communication poor area of the mobile internet when a communication environment with the mobile Internet being used for performing a particular data communication deteriorates,
the controller configured to terminate a connection with the mobile Internet when it is determined that the current location has been registered in the database as a communication poor area of the mobile Internet and access the mobile communication network to continuously perform the particular data communication being performed using the mobile Internet,
the controller configured to register the current location as a communication poor area of the mobile Internet in the database and terminate the connection with the mobile Internet when it is determined that the current location has not been registered in the database as a communication poor area of the mobile Internet and access the mobile communication network to continuously perform the particular data communication being performed using the mobile Internet, and
the controller configured not to determine whether or not the mobile Internet can be connected until such time as the particular data communication is completed via the mobile communication network.

2. A mobile terminal comprising:
a wireless Internet module configured to access a mobile Internet according to a standard protocol of the IEEE 802.16 group;
a mobile communication module configured to access a mobile communication network that includes at least one of a wideband code division multiple access (WCDMA) and a high speed downlink packet access (HSDPA); and
a controller configured to:
set the first network as a corresponding network to execute a first application, and set the second network as a corresponding network to execute a second application;
activate the first application in a state that the second application is activated using the second network;
when the second application is activated, determine whether or not the network set for the first and second applications are the same,
when the networks set for the first and second applications are the same, perform data communication for the first and second applications using the network set for the first and second application, and
when the networks set for the first and second applications are different from each other, adjust the first and second networks, to be used by the first and second applications, into one of the first network and the second network according to pre-set reference;
wherein the first and second applications are part of three or more applications, each of the three or more applications has the first or second network as a set corresponding network, and the networks set for the three or more applications are not the same, and
wherein when the three or more applications are activated, a network used by the three or more applications are adjusted into one of the first and second networks that is more set for the three or more applications.

* * * * *